(12) United States Patent
Dutta

(10) Patent No.: US 11,483,236 B2
(45) Date of Patent: Oct. 25, 2022

(54) STATELESS MULTICAST BASED ON NETWORK LABEL SPACE

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 196 days.

(21) Appl. No.: 16/835,971

(22) Filed: Mar. 31, 2020

(65) Prior Publication Data

US 2021/0306259 A1 Sep. 30, 2021

(51) Int. Cl.
| | |
|---|---|
| *H04L 45/50* | (2022.01) |
| *H04L 45/02* | (2022.01) |
| *H04L 45/16* | (2022.01) |
| *H04L 45/28* | (2022.01) |
| *H04L 45/48* | (2022.01) |

(52) U.S. Cl.
CPC ............. *H04L 45/50* (2013.01); *H04L 45/02* (2013.01); *H04L 45/16* (2013.01); *H04L 45/28* (2013.01); *H04L 45/48* (2013.01)

(58) Field of Classification Search
CPC combination set(s) only.
See application file for complete search history.

(56) References Cited

U.S. PATENT DOCUMENTS

2006/0062218 A1* 3/2006 Sasagawa ............. H04L 67/146
370/389

2010/0124225 A1* 5/2010 Fedyk .................... H04L 41/12
370/390

(Continued)

FOREIGN PATENT DOCUMENTS

WO WO 2019/239173 A1 12/2019

OTHER PUBLICATIONS

Fenner, B., et al., "Protocol Independent Multicast—Sparse Mode (PIM-SM) Protocol Specification (Revised)," Internet Engineering Task Force, RFC 7761, Mar. 2016, 137 pages.

(Continued)

*Primary Examiner* — Xavier S Wong
(74) *Attorney, Agent, or Firm* — Tong, Rea, Bentley & Kim, LLC

(57) ABSTRACT

Various example embodiments for supporting stateless multicast communications in a communication system are presented. Various example embodiments for supporting stateless multicast communications may be configured to support stateless multicast communications in a label switching network (e.g., a Multiprotocol Label Switching (MPLS) network, an MPLS—Traffic Engineered (TE) network, or the like) based on a network label space. Various example embodiments for supporting stateless multicast communications based on a network label space may be configured to support assignment, from a network label space of a network, of a set of labels for nodes of the network and for adjacencies of the network. Various example embodiments for supporting stateless multicast communications based on a network label space may be configured to support assignment of node labels from the network label space for nodes of the network and assignment of adjacency labels from the network label space for adjacencies of the network.

19 Claims, 17 Drawing Sheets

(56) References Cited

U.S. PATENT DOCUMENTS

| | | | |
|---|---|---|---|
| 2014/0334489 A1* | 11/2014 | Bosshart | H04L 47/56 370/392 |
| 2015/0085635 A1 | 3/2015 | Wijnands et al. | |
| 2019/0327168 A1 | 10/2019 | Eckert et al. | |
| 2021/0266272 A1* | 8/2021 | Dutta | H04L 49/3009 |

OTHER PUBLICATIONS

Cain, B., et al., "Internet Group Management Protocol," Version 3, RFC 3376, Network Working Group, Oct. 2002, 53 pages.

Rosen, E., et al., "Multicast in MPLS/BGP IP VPNs," RFC 6513, Internet Engineering Task Force, Feb. 2012, 88 pages.

Aggarwal, R., et al., "BGP Encodings and Procedures for Multicast in MPLS/BGP IP VPNs," Internet Engineering Task Force, RFC 6514, Feb. 2012, 59 pages.

Aggarwal, R., et al., "Resource Reservation Protocol—Traffic Engineering (RSVP-TE) for Point-to-Multipoint TE Label Switched Paths (LSPs)," Network Working Group, RFC 4875, May 2007, 53 pages.

Wijnands, IJ, et al., "Label Distribution Protocol Extensions for Point-to-Multipoint and Multipoint-to-Multipoint Label Switched Paths," Internet Engineering Task Force, RFC 6388, Nov. 2011, 39 pages.

Wijnands, IJ, et al., "Multicast Using Bit Index Explicit Replication (BIER), Internet Engineering Task Force," RFC 8279, Nov. 2017, 43 pages.

Sajassi, A., et al., "BGP MPLW-Based Ethernet VPN," Internet Engineering Task Force, RFC 7432, Feb. 2015, 56 pages.

Aggarwal, R., et al., "Multicast in Virtual Private LAN Service (VPLSL)," Internet Engineering Task Force, RFC 7117, Feb. 2014, 50 pages.

Andersson, L., et al., "LDP Specification," Network Working Group, RFC 5036, Oct. 2007, 135 pages.

Filsfils, C., et al., "Segment Routing Architecture," Internet Engineering Task Force, RFC 8402, Jul. 2018, 32 pages.

Rosen, E., et al., "Multiprotocol Label Switching Architecture," Network Working Group, RFC 3031, Jan. 2001, 61 pages.

Li, Z., et al., "Usecases of MPLS Global Label," draft-li-mpls-global-label-usecases-03, Network Working Group, Oct. 17, 2015, 11 pages.

Iana, "Special-Purpose Multiprotocol Label Switching (MPLS) Label Values," https://www.iana.org/assignments/mpls-label-values/mpls-label-values.xhtml, printed on Mar. 30, 2020, 2 pages.

Eckert et al., "Tree Engineering for Bit Index Explicit Replication (BIER-TE)," draft-ietf-bier-te-arch-07, Mar. 9, 2020, 45 pages.

Broadcom, "10 Tb/s StrataDNX™ Jericho2 Ethernet Switch Series," https://www.broadcom.com/products/ethernet-connectivity/switching/stratadnx/bcm88690, printed on Mar. 30, 2020, 3 pages.

Duffy, Jim, "Arista takes on Cisco, Juniper at routing," https://www.networkworld.com/article/3048914/arista-takes-on-cisco-juniper-at-routing.html, printed on Mar. 30, 2020, 4 pages.

Nokia, "7250 interconnect router," https://www.nokia.com/networks/products/7250-interconnect-router/, printed on Mar. 30, 2020, 5 pages.

streetinsider.com, "Cisco (CSCO) Counters Arista Networks (ANET) Jericho Claim—UBS," https://www.streetinsider.com/Analyst+Comments/Cisco+%28CSCO%29+Counters+Arista+Networks+%28ANET%29+Jericho+Claim+-+UBS/11469747.html, printed on Mar. 31, 2020, 2 pages.

Filsfils et al., "Segment Routing Policy Architecture," draft-filsfils-spring-segment-routing-policy-06, Spring Working Group, May 21, 2018, 34 pages.

Bashandy, et al., "Segment Routing with MPLS data plane" RFC 8660, Dec. 2019, 29 pages.

Eckert, T. et al., "Traffic Engineering for Bit Index Explicit Replication BIER-TE," draft-eckert-bier-te-arch-06.txt, Network Working Group, Nov. 16, 2017, 30 pages.

European Search Report mailed in corresponding EP 21154583.5 dated Jul. 8, 2021, 13 pages.

\* cited by examiner

*FIG. 2A*

| G-ILM OF 111-1 | | |
|---|---|---|
| LABEL | NHLFE | |
| | NEXT-HOP | LABEL |
| GL1 | SELF | NONE |
| ... | ... | ... |
| GL12 | R1->R2 | NONE |
| .... | .... | .... |
| GL15 | R1->R5 | NONE |
| ..... | ..... | ..... |
| GL16 | R1->R6 | NONE |
| ..... | ..... | ..... |

*FIG. 2B*

| G-ILM OF 111-2 | | |
|---|---|---|
| LABEL | NHLFE | |
| | NEXT-HOP | LABEL |
| GL2 | SELF | NONE |
| ... | ... | ... |
| GL21 | R2->R1 | NONE |
| .... | .... | .... |
| GL25 | R2->R5 | NONE |
| ..... | ..... | ..... |
| GL26 | R2->R6 | NONE |
| ..... | ..... | ..... |

*FIG. 2C*

| G-ILM OF 111-3 | | |
|---|---|---|
| LABEL | NHLFE | |
| | NEXT-HOP | LABEL |
| GL3 | SELF | NONE |
| ... | ... | ... |
| GL34 | R3->R4 | NONE |
| .... | .... | .... |
| GL37 | R3->R7 | NONE |
| ..... | ..... | ..... |
| GL38 | R3->R8 | NONE |
| ..... | ..... | ..... |

*FIG. 2D*

| G-ILM OF 111-4 | | |
|---|---|---|
| LABEL | NHLFE | |
| | NEXT-HOP | LABEL |
| GL4 | SELF | NONE |
| ... | ... | ... |
| GL43 | R4->R3 | NONE |
| .... | .... | .... |
| GL47 | R4->R7 | NONE |
| ..... | ..... | ..... |
| GL48 | R4->R8 | NONE |
| ..... | ..... | ..... |

FIG. 2E

| \multicolumn{3}{c|}{G-ILM OF 111-5} |
|---|---|---|
| LABEL | \multicolumn{2}{c|}{NHLFE} |
| | NEXT-HOP | LABEL |
| GL5 | SELF | NONE |
| ... | ... | ... |
| GL51 | R5->R1 | NONE |
| .... | .... | .... |
| GL52 | R5->R2 | NONE |
| ..... | ..... | ..... |
| GL56 | R5->R6 | NONE |
| ..... | ..... | ..... |
| GL57 | R5->R7 | NONE |
| ..... | ..... | ..... |
| GL58 | R5->R8 | NONE |
| ..... | ..... | ..... |

FIG. 2F

| \multicolumn{3}{c|}{G-ILM OF 111-6} |
|---|---|---|
| LABEL | \multicolumn{2}{c|}{NHLFE} |
| | NEXT-HOP | LABEL |
| GL6 | SELF | NONE |
| ... | ... | ... |
| GL61 | R6->R1 | NONE |
| .... | .... | .... |
| GL62 | R6->R2 | NONE |
| ..... | ..... | ..... |
| GL65 | R6->R5 | NONE |
| ..... | ..... | ..... |
| GL67 | R6->R7 | NONE |
| ..... | ..... | ..... |
| GL68 | R6->R8 | NONE |
| ..... | ..... | ..... |

FIG. 2G

| \multicolumn{3}{c|}{G-ILM OF 111-7} |
|---|---|---|
| LABEL | \multicolumn{2}{c|}{NHLFE} |
| | NEXT-HOP | LABEL |
| GL7 | SELF | NONE |
| ... | ... | ... |
| GL73 | R7->R3 | NONE |
| .... | .... | .... |
| GL74 | R7->R4 | NONE |
| ..... | ..... | ..... |
| GL75 | R7->R5 | NONE |
| ..... | ..... | ..... |
| GL76 | R7->R6 | NONE |
| ..... | ..... | ..... |
| GL78 | R7->R8 | NONE |
| ..... | ..... | ..... |

FIG. 2H

| \multicolumn{3}{c|}{G-ILM OF 111-8} |
|---|---|---|
| LABEL | \multicolumn{2}{c|}{NHLFE} |
| | NEXT-HOP | LABEL |
| GL8 | SELF | NONE |
| ... | ... | ... |
| GL83 | R8->R3 | NONE |
| .... | .... | .... |
| GL84 | R8->R4 | NONE |
| ..... | ..... | ..... |
| GL85 | R8->R5 | NONE |
| ..... | ..... | ..... |
| GL86 | R8->R6 | NONE |
| ..... | ..... | ..... |
| GL87 | R8->R7 | NONE |
| ..... | ..... | ..... |

FIG. 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                Label 1                | Exp |0|      TTL      |
+-+-+-+-+-+-+-+-+-+-+-+-+-+-+-+-+-+-+-+-+-+-+-+-+-+-+-+-+-+-+-+-+
|                Label 2                | Exp |0|      TTL      |
+-+-+-+-+-+-+-+-+-+-+-+-+-+-+-+-+-+-+-+-+-+-+-+-+-+-+-+-+-+-+-+-+
~                                                               ~
~                                                               ~
+-+-+-+-+-+-+-+-+-+-+-+-+-+-+-+-+-+-+-+-+-+-+-+-+-+-+-+-+-+-+-+-+
|                Label N                | Exp |S|      TTL      |
+-+-+-+-+-+-+-+-+-+-+-+-+-+-+-+-+-+-+-+-+-+-+-+-+-+-+-+-+-+-+-+-+
```

FIG. 8

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                EMLS-TEI               | Exp |0|      TTL      |
+-+-+-+-+-+-+-+-+-+-+-+-+-+-+-+-+-+-+-+-+-+-+-+-+-+-+-+-+-+-+-+-+
| 0x1 |        NUM LABELS = 9           | Exp |0|      TTL      |
+-+-+-+-+-+-+-+-+-+-+-+-+-+-+-+-+-+-+-+-+-+-+-+-+-+-+-+-+-+-+-+-+
|                  GL15                 | Exp |0|      TTL      |
+-+-+-+-+-+-+-+-+-+-+-+-+-+-+-+-+-+-+-+-+-+-+-+-+-+-+-+-+-+-+-+-+
|                  GL52                 | Exp |0|      TTL      |
+-+-+-+-+-+-+-+-+-+-+-+-+-+-+-+-+-+-+-+-+-+-+-+-+-+-+-+-+-+-+-+-+
|                  GL57                 | Exp |0|      TTL      |
+-+-+-+-+-+-+-+-+-+-+-+-+-+-+-+-+-+-+-+-+-+-+-+-+-+-+-+-+-+-+-+-+
|                  GL73                 | Exp |0|      TTL      |
+-+-+-+-+-+-+-+-+-+-+-+-+-+-+-+-+-+-+-+-+-+-+-+-+-+-+-+-+-+-+-+-+
|                  GL74                 | Exp |0|      TTL      |
+-+-+-+-+-+-+-+-+-+-+-+-+-+-+-+-+-+-+-+-+-+-+-+-+-+-+-+-+-+-+-+-+
|                  GL2                  | Exp |0|      TTL      |
+-+-+-+-+-+-+-+-+-+-+-+-+-+-+-+-+-+-+-+-+-+-+-+-+-+-+-+-+-+-+-+-+
|                  GL3                  | Exp |0|      TTL      |
+-+-+-+-+-+-+-+-+-+-+-+-+-+-+-+-+-+-+-+-+-+-+-+-+-+-+-+-+-+-+-+-+
|                  GL4                  | Exp |0|      TTL      |
+-+-+-+-+-+-+-+-+-+-+-+-+-+-+-+-+-+-+-+-+-+-+-+-+-+-+-+-+-+-+-+-+
|                  GL7                  | Exp |S|      TTL      |
+-+-+-+-+-+-+-+-+-+-+-+-+-+-+-+-+-+-+-+-+-+-+-+-+-+-+-+-+-+-+-+-+
```

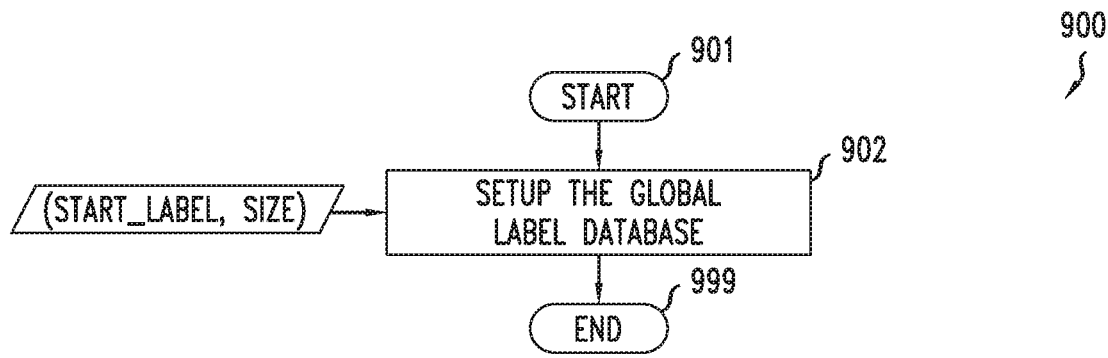
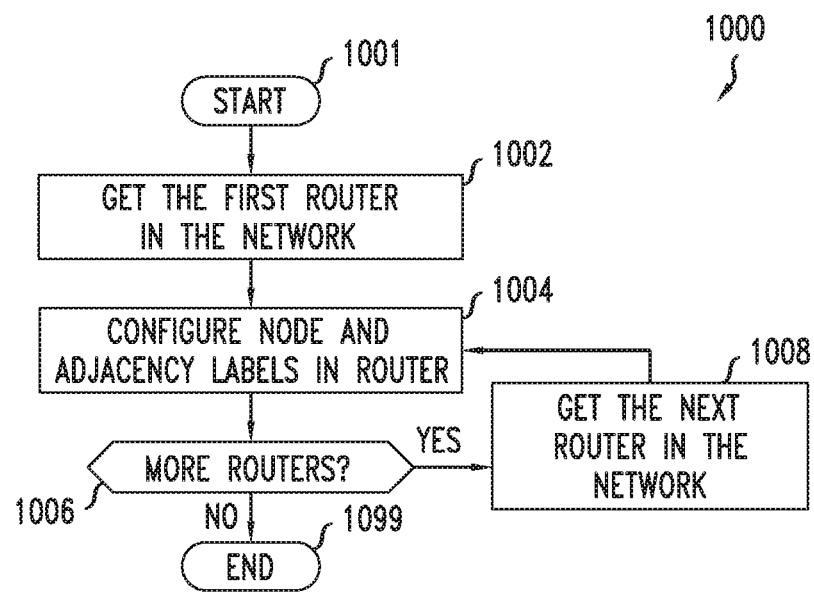

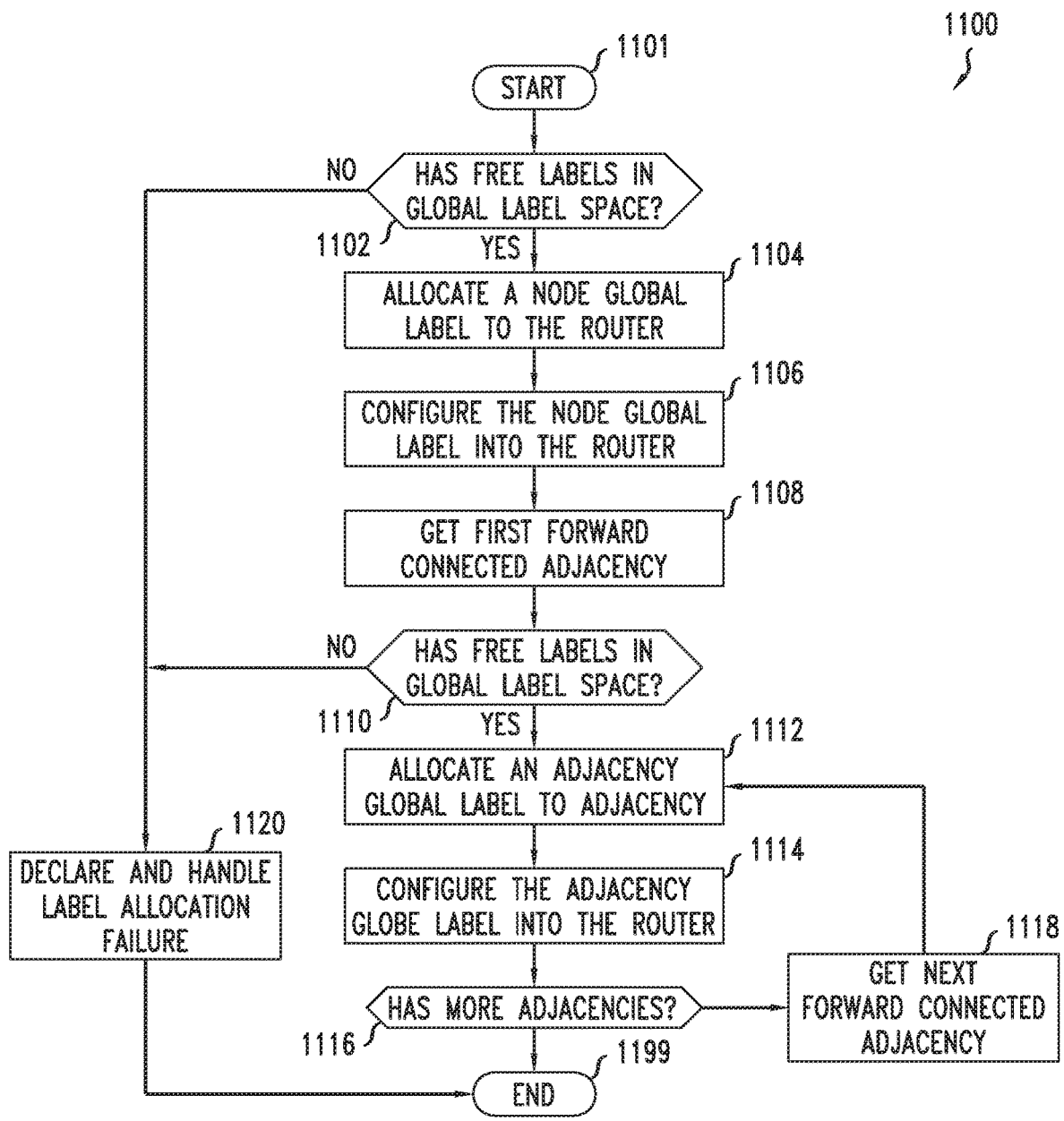

STATELESS MULTICAST BASED ON NETWORK LABEL SPACE

TECHNICAL FIELD

Various example embodiments relate generally to communication systems and, more particularly but not exclusively, to supporting multicast in various types of communication systems.

BACKGROUND

In many communication networks, various communications technologies may be used to support multicast communications.

SUMMARY

In at least some example embodiments, an apparatus includes at least one processor and at least one memory including a set of instructions, wherein the set of instructions is configured to, when executed by the at least one processor, cause the apparatus to support, by a network node of a network, communication of a packet of a multicast flow supported by the network, wherein the packet includes an encoding of an element of an explicit path tree using a label assigned from a network label space of the network, wherein the network label space of the network includes a set of labels for a set of nodes of the network and a set of adjacencies of the network. In at least some example embodiments, the set of labels for the set of nodes of the network and the set of adjacencies of the network includes a set of node labels for the set of nodes of the network and a set of adjacency labels for the set of adjacencies of the network. In at least some example embodiments, the element is an adjacency of the explicit path tree and, to support communication of the packet, the set of instructions is configured to, when executed by the at least one processor, cause the apparatus to determine, based on the label, whether the adjacency is a forward connected adjacency of the network node and forward, toward a next-hop node of the adjacency based on a determination that the adjacency is a forward connected adjacency of the network node, the packet. In at least some example embodiments, to forward the packet, the set of instructions is configured to, when executed by the at least one processor, cause the apparatus to remove, from the packet, the label to form a new packet, create a copy of the new packet, and forward the copy of the new packet toward the next-hop node of the adjacency. In at least some example embodiments, the network node is an ingress node of the explicit path tree, a transit node of the explicit path tree, or a bud node of the explicit path tree. In at least some example embodiments, the element is a node of the explicit path tree and, to support communication of the packet, the set of instructions is configured to, when executed by the at least one processor, cause the apparatus to determine, based on the label, whether the label identifies the network node and handle the packet based on whether the label identifies the network node. In at least some example embodiments, to handle the packet based on a determination that the label does not identify the network node, the set of instructions is configured to, when executed by the at least one processor, cause the apparatus to ignore the label. In at least some example embodiments, to handle the packet based on a determination that the label does identify the network node, the set of instructions is configured to, when executed by the at least one processor, cause the apparatus to create a local copy of the packet, remove, from the local copy of the packet, a header including the label to form a new packet, and forward the new packet to a multicast flow overlay based on a native header of the new packet. In at least some example embodiments, the network node is a transit node of the explicit path tree, a bud node of the explicit path tree, or a leaf node of the explicit path tree. In at least some example embodiments, the network node is an ingress node of the explicit path tree, the explicit path tree includes a set of egress nodes and a set of adjacencies, and the explicit path tree is encoded within the packet. In at least some example embodiments, the explicit path tree is encoded within the packet based on a label stack including an encoding of the explicit path tree, a descriptor associated with the encoding of the explicit path tree, and a label stack identifier configured to indicate a presence of the label stack within the packet. In at least some example embodiments, the encoding of the explicit path tree includes an encoding of a set of node labels identifying the respective egress nodes and a set of adjacency labels identifying the respective adjacencies. In at least some example embodiments, the descriptor associated with the encoding of the explicit path tree includes a field indicative of a number of labels in the encoding of the explicit path tree. In at least some example embodiments, the network node includes an ingress node of the explicit path tree and the set of instructions is configured to, when executed by the at least one processor, cause the apparatus to send, from the network node toward a network controller, a request for the explicit path tree and receive, by the network node from the network controller, a response including a description of the explicit path tree. In at least some example embodiments, the request for the explicit path tree includes a locally assigned identifier for the multicast flow, a set of egress nodes of the multicast flow, and an indication as to whether the network node is requesting that the network controller provide a set of labels of the explicit path tree. In at least some example embodiments, the description of the explicit path tree includes the set of labels of the explicit path tree. In at least some example embodiments, the description of the explicit path tree includes a set of node addresses for the respective nodes of the explicit path tree and a set of adjacency addresses for the respective adjacencies of the explicit path tree, and the set of instructions is configured to, when executed by the at least one processor, cause the apparatus to determine, by the network node based on local mapping information and the set of node addresses, a set of node labels for the respective egress nodes of the explicit path tree, determine, by the network node based on the local mapping information and the set of adjacency addresses, a set of adjacency labels for the respective adjacencies of the explicit path tree, and determine, by the network node based on the set of node labels for the respective egress nodes of the explicit path tree and the set of adjacency labels for the respective adjacencies of the explicit path tree, an encoding of the explicit path tree.

In at least some example embodiments, a non-transitory computer-readable medium stores a set of instructions configured to cause an apparatus to support, by a network node of a network, communication of a packet of a multicast flow supported by the network, wherein the packet includes an encoding of an element of an explicit path tree using a label assigned from a network label space of the network, wherein the network label space of the network includes a set of labels for a set of nodes of the network and a set of adjacencies of the network. In at least some example embodiments, the set of labels for the set of nodes of the network and the set of adjacencies of the network includes a set of node labels for the set of nodes of the network and a set of adjacency labels for the set of adjacencies of the network. In at least some example embodiments, the element is an adjacency of the explicit path tree and, to support communication of the packet, the set of instructions is configured to cause the apparatus to determine, based on the label, whether the adjacency is a forward connected adjacency of the network node and forward, toward a next-hop node of the adjacency based on a determination that the adjacency is a forward connected adjacency of the network node, the packet. In at least some example embodiments, to forward the packet, the set of instructions is configured to cause the apparatus to remove, from the packet, the label to form a new packet, create a copy of the new packet, and forward the copy of the new packet toward the next-hop node of the adjacency. In at least some example embodiments, the network node is an ingress node of the explicit path tree, a transit node of the explicit path tree, or a bud node of the explicit path tree. In at least some example embodiments, the element is a node of the explicit path tree and, to support communication of the packet, the set of instructions is configured to cause the apparatus to determine, based on the label, whether the label identifies the network node and handle the packet based on whether the label identifies the network node. In at least some example embodiments, to handle the packet based on a determination that the label does not identify the network node, the set of instructions is configured to cause the apparatus to ignore the label. In at least some example embodiments, to handle the packet based on a determination that the label does identify the network node, the set of instructions is configured to cause the apparatus to create a local copy of the packet, remove, from the local copy of the packet, a header including the label to form a new packet, and forward the new packet to a multicast flow overlay based on a native header of the new packet. In at least some example embodiments, the network node is a transit node of the explicit path tree, a bud node of the explicit path tree, or a leaf node of the explicit path tree. In at least some example embodiments, the network node is an ingress node of the explicit path tree, the explicit path tree includes a set of egress nodes and a set of adjacencies, and the explicit path tree is encoded within the packet. In at least some example embodiments, the explicit path tree is encoded within the packet based on a label stack including an encoding of the explicit path tree, a descriptor associated with the encoding of the explicit path tree, and a label stack identifier configured to indicate a presence of the label stack within the packet. In at least some example embodiments, the encoding of the explicit path tree includes an encoding of a set of node labels identifying the respective egress nodes and a set of adjacency labels identifying the respective adjacencies. In at least some example embodiments, the descriptor associated with the encoding of the explicit path tree includes a field indicative of a number of labels in the encoding of the explicit path tree. In at least some example embodiments, the network node includes an ingress node of the explicit path tree and the set of instructions is configured to cause the apparatus to send, from the network node toward a network controller, a request for the explicit path tree and receive, by the network node from the network controller, a response including a description of the explicit path tree. In at least some example embodiments, the request for the explicit path tree includes a locally assigned identifier for the multicast flow, a set of egress nodes of the multicast flow, and an indication as to whether the network node is requesting that the network controller provide a set of labels of the explicit path tree. In at least some example embodiments, the description of the explicit path tree includes the set of labels of the explicit path tree. In at least some example embodiments, the description of the explicit path tree includes a set of node addresses for the respective nodes of the explicit path tree and a set of adjacency addresses for the respective adjacencies of the explicit path tree, and the set of instructions is configured to cause the apparatus to determine, by the network node based on local mapping information and the set of node addresses, a set of node labels for the respective egress nodes of the explicit path tree, determine, by the network node based on the local mapping information and the set of adjacency addresses, a set of adjacency labels for the respective adjacencies of the explicit path tree, and determine, by the network node based on the set of node labels for the respective egress nodes of the explicit path tree and the set of adjacency labels for the respective adjacencies of the explicit path tree, an encoding of the explicit path tree.

In at least some example embodiments, a method includes supporting, by a network node of a network, communication of a packet of a multicast flow supported by the network, wherein the packet includes an encoding of an element of an explicit path tree using a label assigned from a network label space of the network, wherein the network label space of the network includes a set of labels for a set of nodes of the network and a set of adjacencies of the network. In at least some example embodiments, the set of labels for the set of nodes of the network and the set of adjacencies of the network includes a set of node labels for the set of nodes of the network and a set of adjacency labels for the set of adjacencies of the network. In at least some example embodiments, the element is an adjacency of the explicit path tree and supporting communication of the packet includes determining, based on the label, whether the adjacency is a forward connected adjacency of the network node and forwarding, toward a next-hop node of the adjacency based on a determination that the adjacency is a forward connected adjacency of the network node, the packet. In at least some example embodiments, forwarding the packet includes removing, from the packet, the label to form a new packet, creating a copy of the new packet, and forwarding the copy of the new packet toward the next-hop node of the adjacency. In at least some example embodiments, the network node is an ingress node of the explicit path tree, a transit node of the explicit path tree, or a bud node of the explicit path tree. In at least some example embodiments, the element is a node of the explicit path tree and supporting communication of the packet includes determining, based on the label, whether the label identifies the network node and handling the packet based on whether the label identifies the network node. In at least some example embodiments, handling the packet based on a determination that the label does not identify the network node includes ignoring the label. In at least some example embodiments, handling the packet based on a determination that the label does identify the network node includes creating a local copy of the packet, removing, from the local copy of the packet, a header including the label to form a new packet, and forwarding the new packet to a multicast flow overlay based on a native header of the new packet. In at least some example embodiments, the network node is a transit node of the explicit path tree, a bud node of the explicit path tree, or a leaf node of the explicit path tree. In at least some example embodiments, the network node is an ingress node of the explicit path tree, the explicit path tree includes a set of egress nodes and a set of adjacencies, and the explicit path tree is encoded within the packet. In at least some example embodiments, the explicit path tree is encoded within the packet based on a label stack including an encoding of the explicit path tree, a descriptor associated with the encoding of the explicit path tree, and a label stack identifier configured to indicate a presence of the label stack within the packet. In at least some example embodiments, the encoding of the explicit path tree includes an encoding of a set of node labels identifying the respective egress nodes and a set of adjacency labels identifying the respective adjacencies. In at least some example embodiments, the descriptor associated with the encoding of the explicit path tree includes a field indicative of a number of labels in the encoding of the explicit path tree. In at least some example embodiments, the network node includes an ingress node of the explicit path tree and the method includes sending, from the network node toward a network controller, a request for the explicit path tree and receiving, by the network node from the network controller, a response including a description of the explicit path tree. In at least some example embodiments, the request for the explicit path tree includes a locally assigned identifier for the multicast flow, a set of egress nodes of the multicast flow, and an indication as to whether the network node is requesting that the network controller provide a set of labels of the explicit path tree. In at least some example embodiments, the description of the explicit path tree includes the set of labels of the explicit path tree. In at least some example embodiments, the description of the explicit path tree includes a set of node addresses for the respective nodes of the explicit path tree and a set of adjacency addresses for the respective adjacencies of the explicit path tree, and the method includes determining, by the network node based on local mapping information and the set of node addresses, a set of node labels for the respective egress nodes of the explicit path tree, determining, by the network node based on the local mapping information and the set of adjacency addresses, a set of adjacency labels for the respective adjacencies of the explicit path tree, and determining, by the network node based on the set of node labels for the respective egress nodes of the explicit path tree and the set of adjacency labels for the respective adjacencies of the explicit path tree, an encoding of the explicit path tree.

In at least some example embodiments, an apparatus includes means for supporting, by a network node of a network, communication of a packet of a multicast flow supported by the network, wherein the packet includes an encoding of an element of an explicit path tree using a label assigned from a network label space of the network, wherein the network label space of the network includes a set of labels for a set of nodes of the network and a set of adjacencies of the network. In at least some example embodiments, the set of labels for the set of nodes of the network and the set of adjacencies of the network includes a set of node labels for the set of nodes of the network and a set of adjacency labels for the set of adjacencies of the network. In at least some example embodiments, the element is an adjacency of the explicit path tree and the means for supporting communication of the packet includes means for determining, based on the label, whether the adjacency is a forward connected adjacency of the network node and means for forwarding, toward a next-hop node of the adjacency based on a determination that the adjacency is a forward connected adjacency of the network node, the packet. In at least some example embodiments, then means for forwarding the packet includes means for removing, from the packet, the label to form a new packet, means for creating a copy of the new packet, and means for forwarding the copy of the new packet toward the next-hop node of the adjacency. In at least some example embodiments, the network node is an ingress node of the explicit path tree, a transit node of the explicit path tree, or a bud node of the explicit path tree. In at least some example embodiments, the element is a node of the explicit path tree and the means for supporting communication of the packet includes means for determining, based on the label, whether the label identifies the network node and means for handling the packet based on whether the label identifies the network node. In at least some example embodiments, the means for handling the packet based on a determination that the label does not identify the network node includes means for ignoring the label. In at least some example embodiments, means for handling the packet based on a determination that the label does identify the network node includes means for creating a local copy of the packet, means for removing, from the local copy of the packet, a header including the label to form a new packet, and means for forwarding the new packet to a multicast flow overlay based on a native header of the new packet. In at least some example embodiments, the network node is a transit node of the explicit path tree, a bud node of the explicit path tree, or a leaf node of the explicit path tree. In at least some example embodiments, the network node is an ingress node of the explicit path tree, the explicit path tree includes a set of egress nodes and a set of adjacencies, and the explicit path tree is encoded within the packet. In at least some example embodiments, the explicit path tree is encoded within the packet based on a label stack including an encoding of the explicit path tree, a descriptor associated with the encoding of the explicit path tree, and a label stack identifier configured to indicate a presence of the label stack within the packet. In at least some example embodiments, the encoding of the explicit path tree includes an encoding of a set of node labels identifying the respective egress nodes and a set of adjacency labels identifying the respective adjacencies. In at least some example embodiments, the descriptor associated with the encoding of the explicit path tree includes a field indicative of a number of labels in the encoding of the explicit path tree. In at least some example embodiments, the network node includes an ingress node of the explicit path tree and the apparatus includes means for sending, from the network node toward a network controller, a request for the explicit path tree and means for receiving, by the network node from the network controller, a response including a description of the explicit path tree. In at least some example embodiments, the request for the explicit path tree includes a locally assigned identifier for the multicast flow, a set of egress nodes of the multicast flow, and an indication as to whether the network node is requesting that the network controller provide a set of labels of the explicit path tree. In at least some example embodiments, the description of the explicit path tree includes the set of labels of the explicit path tree. In at least some example embodiments, the description of the explicit path tree includes a set of node addresses for the respective nodes of the explicit path tree and a set of adjacency addresses for the respective adjacencies of the explicit path tree, and the apparatus includes means for determining, by the network node based on local mapping information and the set of node addresses, a set of node labels for the respective egress nodes of the explicit path tree, means for determining, by the network node based on the local mapping information and the set of adjacency addresses, a set of adjacency labels for the respective adjacencies of the explicit path tree, and means for determining, by the network node based on the set of node labels for the respective egress nodes of the explicit path tree and the set of adjacency labels for the respective adjacencies of the explicit path tree, an encoding of the explicit path tree.

In at least some example embodiments, an apparatus includes at least one processor and at least one memory including a set of instructions, wherein the set of instructions is configured to, when executed by the at least one processor, cause the apparatus to support, by a network node of a network, communication of a packet of a multicast flow supported by the network, wherein the packet includes an encoding of an element of an explicit path tree using a label assigned from a network label space of the network, wherein the network label space of the network includes a set of labels for a set of nodes of the network. In at least some example embodiments, a non-transitory computer-readable medium stores a set of instructions configured to cause an apparatus to support, by a network node of a network, communication of a packet of a multicast flow supported by the network, wherein the packet includes an encoding of an element of an explicit path tree using a label assigned from a network label space of the network, wherein the network label space of the network includes a set of labels for a set of nodes of the network. In at least some example embodiments, a method includes supporting, by a network node of a network, communication of a packet of a multicast flow supported by the network, wherein the packet includes an encoding of an element of an explicit path tree using a label assigned from a network label space of the network, wherein the network label space of the network includes a set of labels for a set of nodes of the network. In at least some example embodiments, an apparatus includes means for supporting, by a network node of a network, communication of a packet of a multicast flow supported by the network, wherein the packet includes an encoding of an element of an explicit path tree using a label assigned from a network label space of the network, wherein the network label space of the network includes a set of labels for a set of nodes of the network.

In at least some example embodiments, an apparatus includes at least one processor and at least one memory including a set of instructions, wherein the set of instructions is configured to, when executed by the at least one processor, cause the apparatus to support, by a network controller of a network including a set of nodes and a set of adjacencies, a network label space for the network, wherein the network label space for the network includes a set of labels including a set of node labels identifying the respective nodes in the set of nodes and a set of adjacency labels identifying the respective adjacencies in the set of adjacencies. In at least some example embodiments, a non-transitory computer-readable medium stores a set of instructions configured to cause an apparatus to support, by a network controller of a network including a set of nodes and a set of adjacencies, a network label space for the network, wherein the network label space for the network includes a set of labels including a set of node labels identifying the respective nodes in the set of nodes and a set of adjacency labels identifying the respective adjacencies in the set of adjacencies. In at least some example embodiments, a method includes supporting, by a network controller of a network including a set of nodes and a set of adjacencies, a network label space for the network, wherein the network label space for the network includes a set of labels including a set of node labels identifying the respective nodes in the set of nodes and a set of adjacency labels identifying the respective adjacencies in the set of adjacencies. In at least some example embodiments, an apparatus includes means for supporting, by a network controller of a network including a set of nodes and a set of adjacencies, a network label space for the network, wherein the network label space for the network includes a set of labels including a set of node labels identifying the respective nodes in the set of nodes and a set of adjacency labels identifying the respective adjacencies in the set of adjacencies.

BRIEF DESCRIPTION OF THE DRAWINGS

The teachings herein can be readily understood by considering the following detailed description in conjunction with the accompanying drawings, in which:

FIGS. 2A-2H depict examples of G-ILM tables programmed into routers by a network controller in the MPLS TE multicast domain of FIG. 1;

FIG. 7 depicts an example embodiment of an EMLS-TE Label Stack for an EMLS-TE of type EMLS-TE-1;

FIG. 8 depicts an example of an EMLS-TE-1 packet for the explicit path tree of the MPLS TE multicast domain of FIG. 1;

FIG. 9 depicts an example embodiment of a method for use by a network controller for configuration of a global label space at the network controller;

FIG. 10 depicts an example embodiment of a method for use by a network controller for configuration of global labels in a network;

FIG. 11 depicts an example embodiment of a method for use by a network controller for configuration of global labels in a router;

To facilitate understanding, identical reference numerals have been used herein, wherever possible, in order to designate identical elements that are common among the various figures.

DETAILED DESCRIPTION

Figure 1:
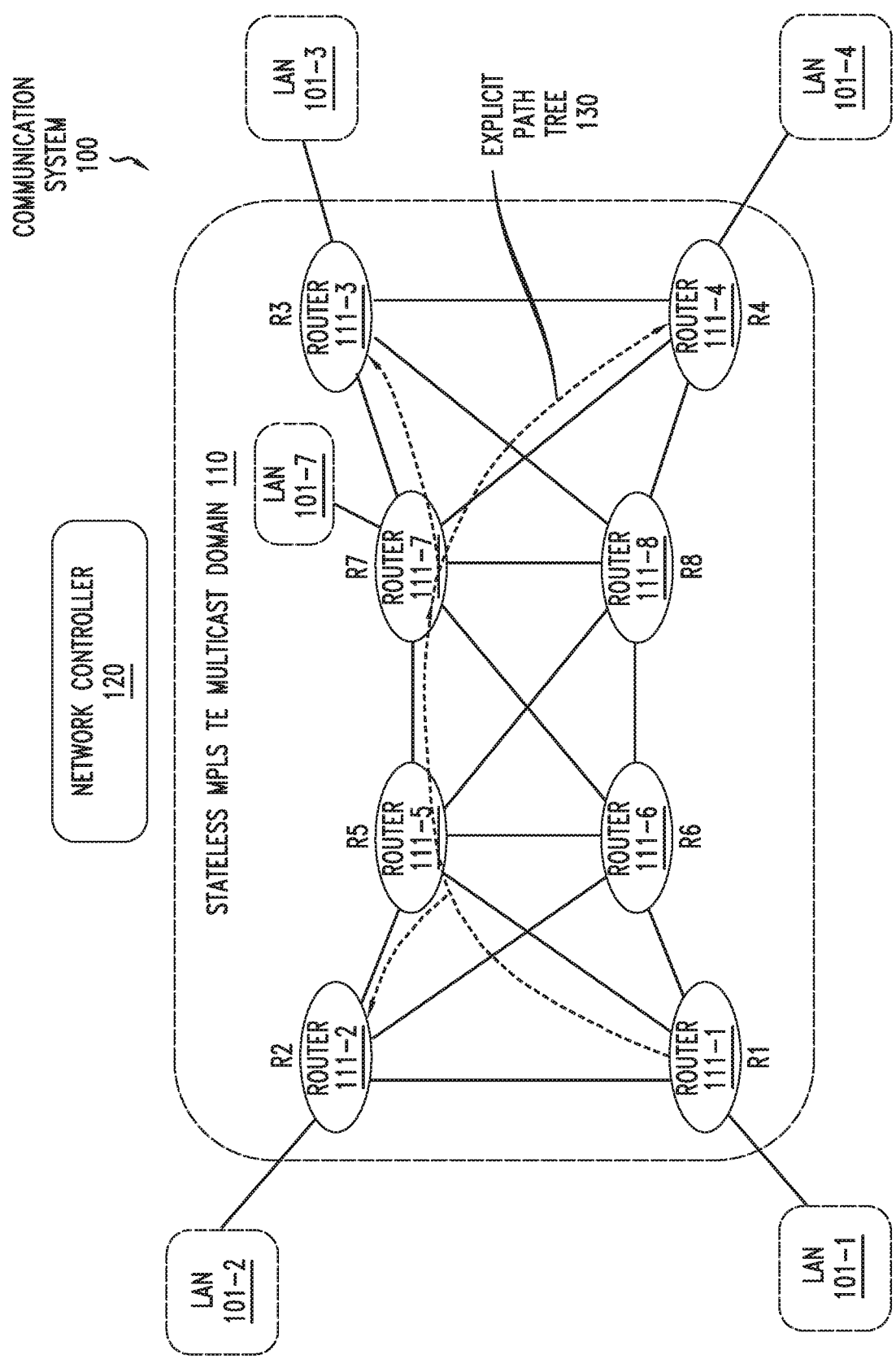
FIG. 1 depicts an example embodiment of a communication system configured to support stateless multicast communications in a Multiprotocol Label Switching—Traffic Engineering (MPLS-TE) multicast domain.

Various example embodiments for supporting stateless multicast communications in a communication system are presented. Various example embodiments for supporting stateless multicast communications may be configured to support stateless multicast communications in a label switching network (e.g., a Multiprotocol Label Switching (MPLS) network, an MPLS—Traffic Engineered (TE) network, or the like) based on a network label space (which is a network-wide label space, or domain-wide label space, that is primarily referred to herein as a global label space). Various example embodiments for supporting stateless multicast communications in a label switching network based on a global label space may be configured to support assignment of a set of global labels from the global label space for nodes of the network and adjacencies of nodes of the network. Various example embodiments for supporting stateless multicast communications in a label switching network based on a global label space may be configured to support assignment of node global labels from the global label space for nodes of the network and adjacency global labels for adjacencies of nodes of the network. Various example embodiments for supporting stateless multicast communications in a label switching network based on a global label space may be configured to support communication of multicast packets on a stateless explicit path tree by pushing a label stack onto the multicast packet, wherein the label stack includes a set of labels of the global label space that uniquely identify the egress nodes of the explicit path tree to which the multicast packet is to be delivered and the adjacencies that form the explicit path tree to be traversed by the multicast packet. Various example embodiments for supporting stateless multicast communications in a label switching network based on a global label space may be configured to support communication of a multicast packet on a stateless explicit path tree based on configuration of routers along the stateless explicit path tree to scan label stack on the multicast packet to look for the node global label that identifies itself (and, if the node global label for itself is found, to make a local copy of the packet, removes the label stack from the copy, and forward the copy to the local context) and/or to look for the adjacency labels for the adjacencies that are forward connected in the router (and, for each adjacency global label for each adjacency forward connected in the router, to remove each such adjacency global label from the label stack and forward a copy of the multicast packet (including the remaining labels) to each adjacency). Various example embodiments for supporting stateless multicast communications may be configured to support, by a network controller of a network including a set of nodes and a set of adjacencies, a global label space for the network, wherein the global label space for the network includes a set of labels including a set of node labels identifying the respective nodes of the network and a set of adjacency labels identifying the respective adjacencies of the network. Various example embodiments for supporting stateless multicast communications may be configured to support, by a network node of a network, communication of a packet of a multicast flow supported by the network, wherein the packet includes an encoding of an element of an explicit path tree using a global label assigned from a global label space of the network, wherein the global label space of the network includes a set of labels for a set of nodes of the network and a set of adjacencies of the network. It will be appreciated that use of the global label space ensures that there is no overlapping of any node or adjacency labels across the stateless multicast domain such that, as each router along the explicit path tree scans the label stack, the router is able to uniquely identify the labels in the label stack that identify itself and/or its forward connected adjacencies. It will be appreciated that these and various other example embodiments and advantages or potential advantages of supporting stateless multicast communications may be further understood by way of reference to the various figures, which are discussed further below.

FIG. 1 depicts an example embodiment of a communication system configured to support stateless multicast communications in a Multiprotocol Label Switching—Traffic Engineering (MPLS-TE) network domain.

The communication system 100 includes a set of local area networks (LANs) 101-1-101-4 (collectively, LANs 101) interconnected via a stateless MPLS TE multicast domain 110 which is controlled by a network controller 120. It will be appreciated that although, for simplicity, the LANs 101 are used as the originators and recipients of packets being multicast via the stateless MPLS TE multicast domain 110, the stateless MPLS TE multicast domain 110 may be configured to support multicast of packets for various other applications (e.g., Virtual Private Networks (VPNs), Virtual Private LAN Services (VPLSs), or the like, as well as various combinations thereof. The stateless MPLS multicast domain 110 includes a set of routers 111-1-111-8 (collectively, routers 111) which, for ease of reference, also are referred to herein as R1-R8, respectively.

The stateless MPLS multicast domain 110 is configured to support multicast communications. In general, multicast is a method of sending packets to a group of interested receivers in a single transmission. In general, multicast uses network infrastructure efficiently by having the source send a packet only once, even if it needs to be delivered to a large number of receivers. The nodes in the network take care of replicating the packet to the multiple receivers, as necessary. This method of transmission ensures that only one copy of the multicast packet traverses a transit link in the network. It will be appreciated that various types of multicast (e.g., Internet Protocol (IP), Multiprotocol Label Switching (MPLS), and the like) may be supported.

In general, as indicated above, multicast communication may be supported based on use of IP multicast. IP multicast is the IP-specific version of the general concept of multicast networking. It uses reserved multicast address blocks in IPV4 and IPV6 as the destination address (e.g., group address G) in the IP header. In Point-to-Multipoint (P2MP) IP multicast, a single IP packet is sent by a source S to the group address G which is received by all nodes that are members of G. Here, a flow can be described as (S, G), i.e. from a source S to the group G constitutes a flow.

In general, as indicated above, multicast communication may be supported based on use of MPLS multicast. MPLS multicast is the MPLS-specific version of multicast networking, where multicast forwarding is performed over Multicast Distribution Trees (MDTs) based on MPLS labels. MPLS MDTs may be set up by control protocols, such as P2MP Resource Reservation Protocol (MPLS-RSVP), Multicast Label Distribution Protocol (mLDP), or the like. It also will be appreciated that applications that use an MDT for multicasting packets could be referred to more generally as a multicast flow overlay.

It will be appreciated that IP/MPLS multicast is often employed in various applications of streaming media, such as IP Television (IPTV), multi-point video conferencing, and the like.

The stateless MPLS multicast domain 110 is configured to support stateless MPLS TE multicast based on a global label space. The global label space is a network-wide label space (and, thus, also may be referred to herein as a network-wide label space or, more generally, as a network label space) for the stateless MPLS multicast domain 110 (and, thus, also may be referred to herein as a domain-wide label space or, more generally, as a domain label space). The routers 111 are configured to support stateless MPLS TE multicast between LANs 101 via the stateless MPLS multicast domain 110 based on the global label space. The routers 111 are configured to support stateless MPLS TE multicast between LANs 101 via the stateless MPLS multicast domain 110 based on use of an explicit path tree encoded within MPLS packets, using labels of the global label space, being multicast between the LANs 101 via the stateless MPLS multicast domain 110.

The network controller 120 is configured to provide various control functions for the stateless MPLS multicast domain 110. For example, the network controller 120 may be configured to support management of the global label space for the stateless MPLS TE multicast domain 110 (e.g., assignment of labels from the global label space, configuration of routers 111 of stateless MPLS TE multicast domain 110 to support assigned labels, or the like). The network controller 120 may be configured to support various other control functions for the stateless MPLS TE multicast domain 110. The network controller 120 may be a Network Management System (NMS), a Software Defined Networking (SDN) controller, a Path Computation Element (PCE), or the like, as well as various combinations thereof.

The communication system 100 is configured to support stateless MPLS TE multicast based on use of a global label space for the stateless MPLS multicast domain 110. The labels from the global label space are assigned to elements of the stateless MPLS multicast domain 110, including routers 111 and adjacencies of the routers 111. The labels from the global label space are assigned to elements of the stateless MPLS multicast domain 110, including routers 111 and adjacencies of the routers 111, by the network controller 120. The labels from the global label space are assigned to elements of the stateless MPLS multicast domain 110, including routers 111 and adjacencies of the routers 111, as follows.

In the stateless MPLS multicast domain 110, the routers 111 are each assigned a label from the global label space (denoted as a node global label, or node label) that uniquely identifies the router 111 in the stateless MPLS multicast domain 110. For example, each of R1-R8 is assigned a node global label. In an IP network, a node global label of a router may be mapped to an identifier that provides a unique identity of the router in the stateless MPLS multicast domain 110. For example, the identifier of the router to which the node global label is mapped may be an IP address of the router (e.g., a routable loopback IP address in the router, wherein the loopback IP address provides the unique identity of the router in the stateless MPLS multicast domain 110).

In the stateless MPLS multicast domain 110, the adjacencies between the routers 111 are each assigned a pair of labels from the global label space (denoted as adjacency global labels, or adjacency labels), one for each direction. For example, adjacency between R5 and R7 has two directions—R5→R7 and R7→R5, and each direction will be assigned a respective adjacency global label that uniquely identifies the respective direction of the respective adjacency. In an IP network, each end of an adjacency is assigned an IP address, so an adjacency is uniquely identified across the domain by the pair of IP addresses of the adjacency. Thus, a label assigned for a direction in an adjacency may be mapped to the pair of {local IP address, remote IP address} of the adjacency in that direction (e.g., in R5→R7, the local IP address is the one in R5 and remote IP address is the one in R7). Herein, unless indicated otherwise, each direction of an adjacency itself will be referred to as the "adjacency".

In the stateless MPLS multicast domain 110, each router 111 maintains a global—incoming label map (G-ILM) table in the MPLS dataplane, wherein a label allocated from global label space is programmed to map the label to its appropriate forwarding context. A G-ILM entry encodes the forwarding context in a Next-Hop Label Forwarding Entry (NHLFE), which includes all required directives to forward the packet. The G-ILM in a router may be provided in addition to the "default" ILM table of the MPLS dataplane, since the labels allocated from local label space of the router continue to be programmed in the default ILM table. Herein, the local label space means a per-platform label space and the default ILM Table is programmed to make forwarding decisions for labels allocated from the per-platform label space; however, it will be appreciated that there also or alternatively could be also other local label space types (e.g., per-interface label spaces or the like). The network controller 120, for each router 111 of the stateless MPLS multicast domain 110, programs the G-ILM with the following labels: (1) the node global label of the router 111 is programmed with the forwarding context as "local" or the "self" and (2) the adjacency global label for each adjacency of the router 111 that is "forward connected" (i.e., direction is from the router 111 to a neighboring router 111) is programmed with the forwarding context as the adjacency to the neighboring router 111. It will be appreciated that the use of the global label space ensures that there is no overlapping of any node or adjacency labels across the stateless MPLS TE multicast domain 110.

In the stateless MPLS multicast domain 110, when an ingress router 111 needs to send a packet for the multicast flow, it pushes a label stack onto the packet, wherein the label stack includes the node global labels of the egress routers of the explicit path tree and the adjacency global labels for the adjacencies that form the explicit path tree. This label stack is referred to herein generally as an Explicit Multicast Label Stack (EMLS). The labels can be encoded within the EMLS in any random order. A packet encoded with an EMLS is denoted as an EMLS packet. In the case in which the domain supports TE and the label stack represents an explicit path multicast tree encoded with node and adjacency global labels, the EMLS may be referred to as an EMLS-TE-1 and a packet encoded with an EMLS-TE-1 may be denoted as an EMLS-TE-1 packet (where "1" is used to indicate that a global label space is being used).

In the stateless MPLS multicast domain 110, an ingress router 111 may perform the following operations to forward an EMLS-TE-1 packet along an explicit path tree: (1) look up each global label in the EMLS-TE-1 in its G-ILM, to identify the labels that indicate its forward connected adjacencies, (2) remove, for the identified adjacencies, the corresponding global labels from the EMLS-TE-1, and (3) for each forward connected adjacency, make a copy of the EMLS-TE-1 packet and send the packet to the next-hop of the forward connected adjacency.

In the stateless MPLS multicast domain 110, a router that receives an EMLS-TE-1 packet may perform the following operations to forward the EMLS-TE-1 packet along the explicit path tree: (1) look up each global label in the EMLS-TE-1 in its G-ILM, to identify the labels that indicate its forward connected adjacencies, (2) remove, for the identified adjacencies, the corresponding global labels from the EMLS-TE-1, and (3) for each forward connected adjacency, make a copy of the EMLS-TE-1 packet and send the packet to the next-hop of the forward connected adjacency. The router that receives the EMLS-TE-1 packet also, if a global label looked up in (1) indicates the router itself, makes a local copy of the packet, removes the EMLS-TE-1 from the local copy of the packet, and forwards the resultant local copy of the packet to the multicast flow overlay based on its native headers.

In this manner, the multicast packet gets replicated along the explicit path tree and, eventually, a copy is received by each egress router. It is noted that the copy received by an egress router may include labels in the EMLS-TE-1 that have no context in its G-ILM (e.g., such labels identify adjacencies along a sub-tree rooted at a branch point of the explicit path tree which is not traversed by this copy and/or the labels that identify other egress routers) and, thus, which may be ignored by the egress router.

It will be appreciated that, since the adjacency and node labels encoded in EMLS-TE-1 are from a global label space (i.e., a network-wide label space), there is no label switching/swapping action required in a forwarding router on any labels encoded in EMLS-TE-1 (rather, the non-local labels are forwarded "as is" in the packet). Similarly, it will be appreciated that, if a label is received in EMLS-TE-1 by a router that has no forwarding context in the G-ILM of the router, the label is included "as is" in the forwarded EMLS-TE-1 packet(s).

It will be appreciated that, in at least some embodiments, unicast packets also may be sent over a stateless explicit path (which also may be a traffic engineered path) by pushing a label stack, where the label stack consists of the node global labels and adjacency global labels along the explicit path, in the order of occurrence along the explicit path. In at least some such embodiments, each router along the explicit path looks up the "top most" global label in the stack in its G-ILM, pops the global label, and forwards the unicast packet according to the context of the G-ILM entry. This pop-and-forward continues along the explicit path until the label stack becomes empty at the egress router of the unicast packet.

It will be appreciated that various aspects of supporting multicast over an explicit path tree based on use of a global label space may be further understood by further considering the stateless MPLS TE multicast domain 110 of FIG. 1.

In stateless MPLS TE multicast domain 110, each of the routers 111 maintains both a G-ILM table and at least a default ILM table (as it will be appreciated that the routers 111 also may maintained other types of ILM tables, such as a per-interface ILM Table for labels allocated from a per-interface label space, an upstream ILM Table for processing labels assigned by an upstream router), or the like, as well as various combinations thereof).

The network controller 120 allocates the global labels, including the node global labels and the adjacency global labels, in the stateless MPLS TE multicast domain 110.

In stateless MPLS TE multicast domain 110, assume that routers R1-R8 are assigned node global labels GL1-GL8, respectively. A node global label is assigned to a network-wide unique identifier of the router, which is denoted herein as a "node address". For example, in an IP network, the node address could be the loopback IP address of the router. The network controller 120 programs the G-ILM table in each router with its assigned node global label. A node global label entry in the G-ILM table maps to the NHLFE that is programmed with the next-hop as "self".

In stateless MPLS TE multicast domain 110, assume that each adjacency between the routers R1-R8 is assigned an adjacency global label, respectively. The adjacency from router Rx to router Ry is denoted as Rx→Ry. An adjacency Rx→Ry can be uniquely identified in the network by the tuple {RxAddr, RyAddr}, wherein RxAddr is an address assigned on the adjacency in Rx and RyAddr is an address assigned on the adjacency in Ry. This tuple is denoted herein as "adjacency address". For example, in an IP network, the tuple consists of the IP addresses assigned to the local-end and the remote-end of the adjacency, respectively. The label allocated to adjacency Rx→Ry is denoted GLxy. For example, the adjacency R2→R5 is allocated label GL25 and adjacency R5→R2 is allocated label GL52. The network controller 120 programs the G-ILM table in a router with the label for an adjacency which is "forward connected" (i.e., the direction is from the router to the neighbor). For example, for router 111-1, the forward connected adjacencies are R1→R2, R1→R5, and R1→R6, and labels for only those adjacencies (i.e., GL12, GL15, and GL16, respectively) are programmed into the G-ILM table in router 111-1. In the G-ILM table, a label for a forward connected adjacency maps to the NHLFE that is programmed with the next-hop information of the forward connected adjacency. The NHLFE has no label, because there are no labels to push into the packet while forwarding to the next-hop. The G-ILM tables programmed into the routers 111-1-111-8 (R1-R8) by the network controller 120 are depicted in FIGS. 2A-2H, respectively. It is noted that the node global label and adjacency global labels configured in each of the routers 111 may be flooded across the network as Link State Advertisements (LSAs) of one or more routing protocols (e.g., Open Shortest Path First (OSPF), OSPF version 3 (OSPFv3), Intermediate-System-to-Intermediate-System (IS-IS), Border Gateway Protocol—Link State (BGP-LS), or the like) such that each of the routers learns the global labels assigned to remote nodes and adjacencies in the stateless MPLS TE multicast domain 110.

In stateless MPLS TE multicast domain 110, an explicit path tree 130 may be configured for an example multicast flow for supporting communication of multicast packets of the multicast flow based on global labels of the global label space of stateless MPLS TE multicast domain 110. The source of the multicast flow is in LAN 101-1, which is the local network of router 111-1. The packets for the multicast flow are received by LANs 101-2, 101-3, 101-4, and 101-7, which are the local networks of routers 111-2, 111-3, 111-4, and 111-7, respectively. Thus, router 111-1 is the ingress router of the multicast flow and routers 111-2, 111-3, 111-4, and 111-7 are the egress routers of the multicast flow. The router 111-1 intends to send the multicast flow along an explicit path tree that meets the QoS requirements of the flow, such that the explicit path tree may be considered to be a TE explicit path tree. The router 111-1 sends a request to the network controller 120 for computing an explicit path tree with the required QoS. The network controller 120 computes the explicit path tree 130 in response to the request from the router 111-1. The explicit path tree 130 computed by the network controller 120 is composed of the forward connected adjacencies as follows: (1) from 111-1=R1→R5, (2) from 111-5={R5→R2, R5→R7}, and (3) from 111-7={R7→R3, R7→R4}, and the nodes {R2, R3, R4, R7}. As evident from the explicit path tree 130, the router 111-7 is a bud router, since it is a leaf as well as a transit router in the explicit path tree 130. The network controller 120 responds to ingress router 111-1 with the explicit path tree 130 in one of the following two forms: (1) as the set of node and adjacency labels that form the explicit path tree: {GL15, GL52, GL57, GL73, GL74, GL2, GL3, GL4, GL7} (e.g., when there is no flooding of global label mappings by the routing protocols and, thus, the routers 111 are unable to map the node and adjacency addresses of the nodes and adjacencies to the node global labels and adjacency global labels of the nodes and adjacencies, respectively) or (2) as the set of nodes and adjacencies that form the explicit path tree: {R1→R5, R5→R2, R5→R7, R7→R3, R7→R4, R2, R3, R4, R7} (e.g., when there is flooding of global label mappings by the routing protocols and, thus, the routers 111 are able to map the node and adjacency addresses of the nodes and adjacencies to the node global labels and adjacency global labels of the nodes and adjacencies, respectively).

In stateless MPLS TE multicast domain 110, global labels may be used to support communication of multicast packets of the multicast flow via the explicit path tree 130. The ingress router 111-1, for any packet for the multicast flow received from LAN 101-1, pushes an EMLS-TE-1 that encodes the adjacency global labels of the adjacencies in the explicit path tree 130 and the node global labels of the egress routers of the explicit path tree 130: {GL15, GL52, GL57, GL73, GL74, GL2, GL3, GL4, GL7}.

The router 111-1, to forward the packet, looks up each global label in the EMLS-TE-1 in its G-ILM (FIG. 2A). GL15 is the only forward connected adjacency of router 111-1, so router 111-1 removes GL15 from the EMLS-TE-1 and forwards the packet over R1→R5 with EMLS-TE-1={GL52, GL57, GL73, GL74, GL2, GL3, GL4, GL7}.

The router 111-5 receives the packet forwarded on R1→R5 with EMLS-TE-1={GL52, GL57, GL73, GL74, GL2, GL3, GL4}. The router 111-5 looks up each global label in the EMLS-TE-1 in its G-ILM (FIG. 2E). The router 111-5, from the lookup, finds GL52 and GL57 as the two forward connected adjacencies R5→R2 and R5→R7, respectively. So, the router 111-5 removes the two labels from the EMLS-TE-1 and forwards a copy to each adjacency with EMLS-TE-1={GL73, GL74, GL2, GL3, GL4, GL7}.

The router 111-2 receives the copy forwarded on R5→R2 with EMLS-TE-1={GL73, GL74, GL2, GL3, GL4, GL7}. The router 111-2 looks up each global label in the EMLS-TE-1 in its G-ILM (FIG. 2B). The router 111-2, from the lookup, finds only GL2, which identifies itself. So, the router 111-2 removes the EMLS-TE-1 from the packet and forwards the packet to LAN 101-2 based on processing of the native header of the packet.

The router 111-7 receives the copy forwarded on R5→R7 with EMLS-TE-1={GL73, GL74, GL2, GL3, GL4, GL7}. The router 111-7 looks up each global label in the EMLS-TE-1 in its G-ILM (FIG. 2G). The router 111-7, from the lookup, finds GL7, which identifies itself. So, the router 111-7 makes a local copy of the packet, removes EMLS-TE-1 from the copy, and forwards the local copy to LAN 101-7 based on processing the native header of the copy. The router 111-7 from the lookup, also finds GL73 and GL74 as the two forward connected adjacencies R7→R3 and R7→R4, respectively. So, the router 111-7 removes the labels {GL73, GL74} from the EMLS-TE-1 and forwards a copy to each adjacency with EMLS-TE-1={GL2, GL3, GL4}.

The router 111-3 receives the copy forwarded on R7→R3 with EMLS-TE-1={GL2, GL3, GL4}. The router 111-3 looks up each global label in the EMLS-TE-1 in its G-ILM (FIG. 2C). The router 111-3, from the lookup, finds only GL3, which identifies itself. So, the router 111-3 removes the EMLS-TE-1 from the packet and forwards the packet to LAN 101-3 based on processing of the native header of the packet.

The router 111-4 receives the copy forwarded on R7→R4 with EMLS-TE-1={GL2, GL3, GL4}. The router 111-4 looks up each global label in the EMLS-TE-1 in its G-ILM (FIG. 2D). The router 111-4, from the lookup, finds only GL4, which identifies itself. So, the router 111-4 removes the EMLS-TE-1 from the packet and forwards the packet to LAN 101-4 based on processing of the native header of the packet.

It will be appreciated that, although primarily presented with respect to use of a single domain architecture (e.g., the stateless MPLS TE multicast domain is a single domain having a global label space), in at least some example embodiments a multi-domain architecture (e.g., the stateless MPLS TE multicast domain includes multiple sub-domains having multiple global label spaces, respectively) may be supported.

In at least some example embodiments, a stateless MPLS TE multicast domain may be divided into multiple sub-domains having multiple global label spaces, respectively. The explicit path tree may span the multiple domains and the use of the multiple domains may provide various efficiencies associated with encoding of the explicit path tree within packets sent over the explicit path tree. For example, the multi-domain architecture may be used to prevent the number of encoded labels in an encoding of an explicit path tree from growing linearly with the size of the explicit path tree (in terms of nodes and adjacencies). This will be further appreciated when considering that (1) a router that processes an EMLS-TE-1 packet needs to look up and make forwarding decision on each global label in the EMLS-TE-1 label stack of the EMLS-TE-1 packet, such that processing of EMLS-TE-1 packet is a linear process, i.e., of O(N) complexity wherein N is the number of global labels encoded in the EMLS-TE-1 label stack of the EMLS-TE-1 packet and (2) the number of encoded global labels grow linearly with the size of the explicit path tree (in terms of nodes and adjacencies), which increases the overhead of the EMLS-TE-1 packets. The multi-domain architecture may be configured to mitigate such issues by limiting the size of the EMLS-TE-1 in the EMLS-TE-1 packet to the size of the portion of the explicit path tree (in terms of nodes and adjacencies) in the sub-domain of the multi-domain architecture, for each of the sub-domains of the multi-domain architecture. As a result, the size of EMLS-TE-1 does not grow linearly with the number of nodes and adjacencies that form the explicit path tree. It will be appreciated that the multi-domain architecture may be further understood by way of reference to the example communication system of FIG. 3.

Figure 3:
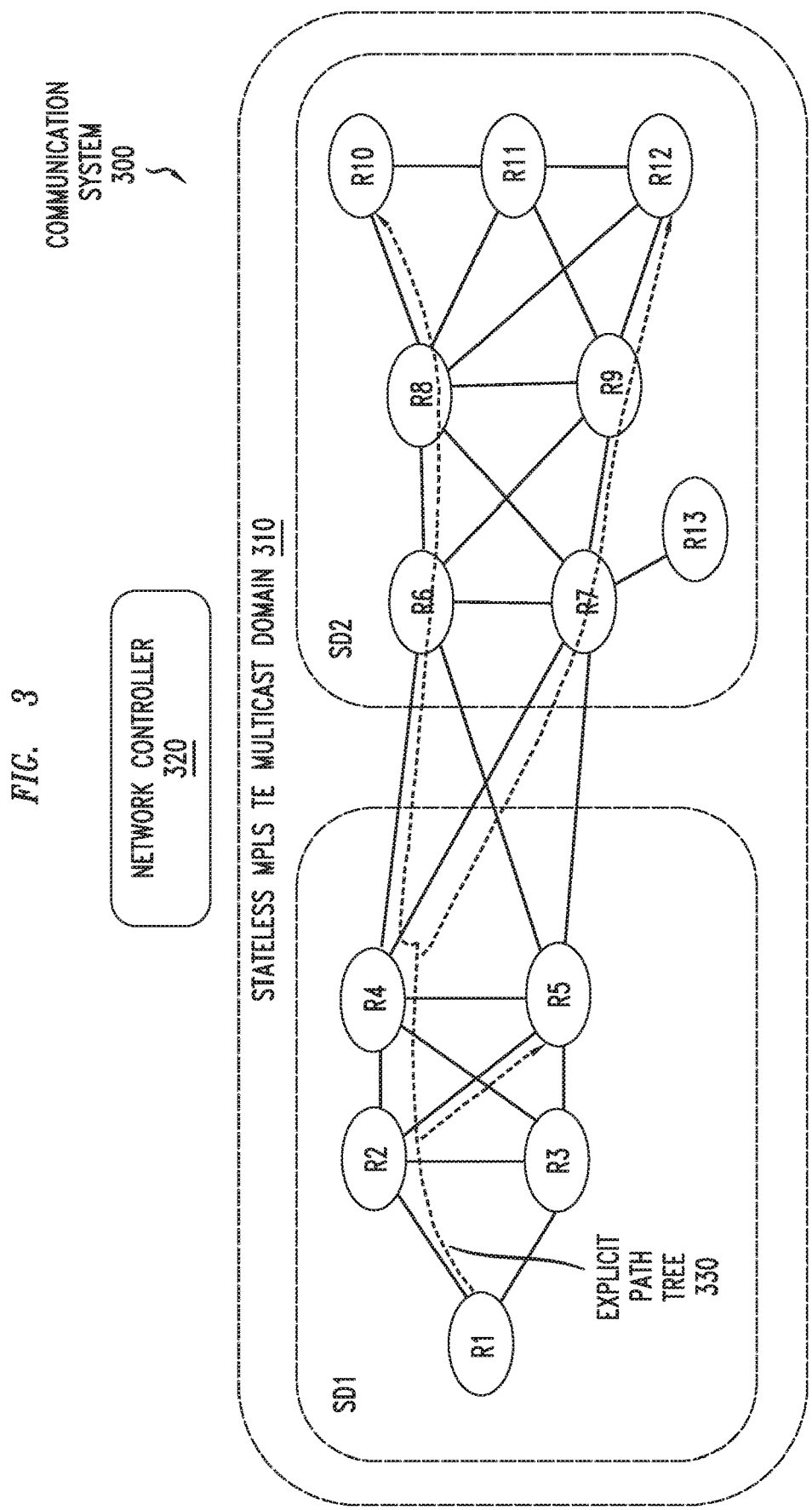
FIG. 3 depicts an example embodiment of a communication system configured to support stateless multicast communications in an MPLS TE multicast domain implemented as a set of multiple sub-domains.

FIG. 3 depicts an example embodiment of a communication system configured to support stateless multicast communications in an MPLS TE multicast domain implemented as a set of multiple sub-domains.

The example communication system 300 includes a stateless MPLS TE multicast domain 310 which is controlled by a network controller 320. The stateless MPLS TE multicast domain 310 includes thirteen routers (denoted as R1-R13, respectively). The stateless MPLS TE multicast domain 310 is divided into two sub-domains (denoted as SD1 and SD2). The routers R1-R5 are members of SD1 and routers R6-R13 are members of SD 2. It will be appreciated that more than two SDs may be used. The network controller 320 assigned global labels to all routers and adjacencies across the domain. The node global label for router Rx is denoted as GLx and adjacency global label for Rx→Ry is denoted with GLxy. Typically, an SD is limited by the maximum number of the adjacencies and routers it allows. The rule is that, when an EMLS-TE-1 packet traverses a specific SD, then, within the SD, the EMLS-TE-1 packet carries the global labels for the subset of nodes and adjacencies that belong to that SD only. For a multi-domain explicit path tree, the EMLS-TE-1 packet does not have to encode the nodes and adjacencies of the entire tree, so the size of EMLS-TE-1 does not grow linearly with the size of the multi-domain tree. It will be appreciated that such aspects may be further understood from the following example.

As an example, for a specific multicast flow, assume that R1 is the ingress router and R5 and R10-R13 are the egress (leaf) routers. The network controller 120 computes an explicit path tree 330 that spans across SD 1 and SD 2. R6 and R7 are the border routers of SD 2, through which the explicit path tree enters SD 2. So, R6 and R7 are ingress routers of two subtrees, in SD 2, of the explicit path tree. The network controller 120 allocates a Tree Label, in a border router from its respective local label space, that maps to the EMLS-TE-1 containing the node global labels and adjacency global labels of the subtree. Here, assume that the Tree Label allocated in R6 is TL60, which maps to the EMLS-TE-1={GL6_8, GL8_10, GL8_11, GL10, GL11} and that the Tree Label allocated in R7 is TL7, which maps to the EMLS-TE-1={GL7_9, GL9_12, GL7_13, GL12, GL13}.

In continuation of this example, to send a packet for the multicast flow, an ingress router pushes the EMLS-TE-1 containing node global labels and adjacency global labels for the subset of the explicit path tree within its local SD, and a TLS for each border router in adjoining subdomain, wherein each TLS encodes the tuple {Gateway Label, Tree Label}. A TLS encodes the node global label of the border router as "Gateway Label" and encodes the tree label of a subtree programmed in the border router as "Tree Label". So, to send a packet in the exemplary multicast flow, R1 encodes the EMLS-TE-1={GL2_5, GL2_4, GL5, GL4_6, GL4_7, TLS={GL6, TL6}, TLS={GL7, TL7}} and pushes the EMLS-TE-1 onto the packet to form an EMLS-TE-1 packet. R1 sends the EMLS-TE-1 packet to R2.

R2 receives the EMLS-TE-1 packet and replicates the EMLS-TE-1 packet into the following two copies: (1) Copy-1: EMLS-TE-1={GL5, GL4_6, GL4_7, TLS={GL6, TL6}, TLS={GL7, TL7}} sent to R2→R4 and (2) Copy-2: EMLS-TE-1={GL5, GL4_6, GL4_7, TLS={GL6, TL6}, TLS={GL7, TL7}} sent to R2→R5. It is noted that R2 looks up the Gateway Label of a TLS in its G-ILM and does not find its ILM entry with forwarding context as "self", so it passes on the TLS in the EMLS-TE-1 to the forwarded packet(s). It will be appreciated that this procedure applies at each forwarding router.

R4 receives Copy-1 from R2, it replicates the packet into following two copies: (1) Copy-3: EMLS-TE-1={GL5, TLS={GL6, TL6}, TLS={GL7, TL7}} sent to R4→R6 and (2) Copy-4: EMLS-TE-1={GL5, TLS={GL6, TL6}, TLS={GL7, TL7}} sent to R4→R7.

R5 receives Copy-2 from R2 and, since the label GL5 in its G-ILM indicates that it is the egress router and there is no forward connected adjacency on the remaining labels (including the Gateways Labels in the TLSes), R5 strips the EMLS-TE-1 and handles the packet based on its native header.

R6 receives Copy-3 from R4 and finds that it is the border router for TLS={GL6, TL6}, since the G-ILM entry for GL6 is programmed as "self", so R6 translates the Tree Label TL6 to EMLS-TE-1={GL6_8, GL8_10, GL8_11, GL10, GL11}. None of the other labels in Copy-3 have any forward connected adjacency in R6, so R6 processes the EMLS-TE-1 mapped to TL6 alone and generates the following copy: Copy-5: EMLS-TE-1={GL8_10, GL8_11, GL10, GL11} sent to R6→R8.

R7 receives Copy-4 from R4 and finds that it is the border router for TLS={GL7, TL7}, since the G-ILM entry for GL7 is programmed as "self", so R7 translates the Tree Label TL7 to EMLS-TE-1={GL7_9, GL9_12, GL7_13, GL12, GL13}. None of the other labels in Copy-4 have any forward connected adjacency in R7, so R7 processes the EMLS-TE-1 mapped to TL7 alone and generates the following two copies: (1) Copy-6: EMLS-TE-1={GL9_12, GL12, GL13}. sent to R7→R9 and (2) Copy-7: EMLS-TE-1={GL9_12, GL12, GL13}. sent to R7→R13.

R8 receives Copy-5 from R6 and replicates the packet into the following two copies: (1) Copy-8: EMLS-TE-1={GL10, GL11} to R8→R10 and (2) Copy-9: EMLS-TE-1={GL10, GL11} to R8→R11.

R9 receives Copy-6 from R7 and replicates the packet into the following copy: Copy-10: EMLS-TE-1={GL12, GL13} to R9→R12.

R13 receives Copy-7 from R78 and, since the label GL13 in its G-ILM indicates that it is the egress router and there is no forward connected adjacency on the remaining labels, R13 strips the EMLS-TE-1 and handles the packet based on its native header.

R10 receives Copy-8 from R8 and, since the label GL10 in its G-ILM indicates that it is the egress router and there is no forward connected adjacency on the remaining labels, R10 strips the EMLS-TE-1 and handles the packet based on its native header.

R11 receives Copy-9 from R8 and, since the label GL11 in its G-ILM indicates that it is the egress router and there is no forward connected adjacency on the remaining labels, R11 strips the EMLS-TE-1 and handles the packet based on its native header.

R12 receives Copy-10 from R9 and, since the label GL12 in its G-ILM indicates that it is the egress router and there is no forward connected adjacency on the remaining labels, R12 strips the EMLS-TE-1 and handles the packet based on its native header.

It will be appreciated that the TLS used in a multi-domain stateless MPLS TE multicast domain may be formatted in various ways. In at least some example embodiments, the TLS may be formatted as depicted in FIG. 4.

Figure 4:
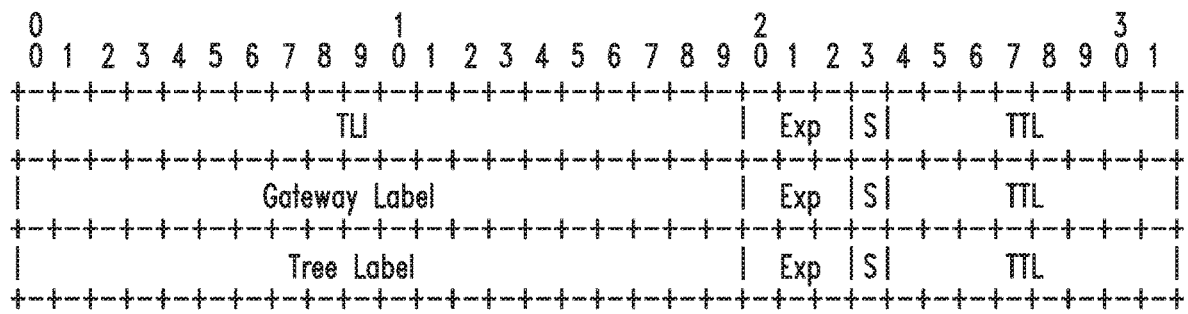
FIG. 4 depicts an example embodiment of a TLS for use in a multi-domain stateless MPLS TE multicast domain.

FIG. 4 depicts an example embodiment of a TLS for use in a multi-domain stateless MPLS TE multicast domain. The TLS 400 includes a Tree Label Indicator (TLI) Label, a Gateway Label (GL) Label, and a Tree Label (TL) Label.

The TLI Label is configured to enable a receiving router to distinguish unambiguously between the TLS and the labels that represent egress routers. When TLS is embedded within EMLS, a receiving router needs to be able to distinguish unambiguously between the labels that represent egress routers and the TLS. To accomplish this, the first label in a TLS is the TLI Label, where preceding means closer to the top of the label stack (farther from the Bottom of Stack indication). TLI Label is a special label that that is not expected to be used for any other purposes. The TLI Label includes a 20-bit TLI field, a 3-bit EXP field, a 1-bit S field (or S bit), and an 8-bit TTL field. The TLI field of the TLI Label may have a value of TLI or any other suitable value, which may be reserved at the IANA registry on Special-purpose labels. The EXP and TTL fields in EMLS-TEI label are set to 0, as those fields are not expected to have any significance. The S bit is set to 0 since other labels follow the TLI Label in the TLS.

The GL Label is configured to identify the gateway router (i.e., the label of the unicast LSP to the gateway router). The label is assigned to a loopback address in the gateway router and advertised in the MPLS control plane (e.g., LDP, SR, or the like). The GL Label includes a 20-bit Gateway Label field (encoding the label that identifies the gateway router), a 3-bit EXP field, a 1-bit S field (or S bit), and an 8-bit TTL field. The Gateway Label is encoded as the node global label assigned to the gateway/border router, and a forwarding router along the explicit path tree does not perform any switching action of the this node global label, rather, it simply forwards the TLS along the explicit path tree until the TLS reaches the gateway/border router.

The TL Label is configured to identify the explicit path tree (e.g., stateless MPLS multicast tree) that originates at the gateway router. The TL Label includes a 20-bit Tree Label field (encoding the label that identifies the explicit path tree), a 3-bit EXP field, a 1-bit S field (or S bit), and an 8-bit TTL field. The Tree Label is allocated from the local label space of the gateway router. The Tree Label maps to an EMLS-TE-1 that encodes the node global labels and adjacency global labels of an explicit path tree rooted at the router that programmed the Tree Label.

It will be appreciated that a TLS for use in a multi-domain stateless MPLS TE multicast domain may be formatted in various other ways.

It will be appreciated that the EMLS-TE used to encode node and adjacency labels along a stateless explicit path tree may be formatted in various ways. In at least some example embodiments, the EMLS-TE may be formatted as depicted in FIG. 5.

Figure 5:
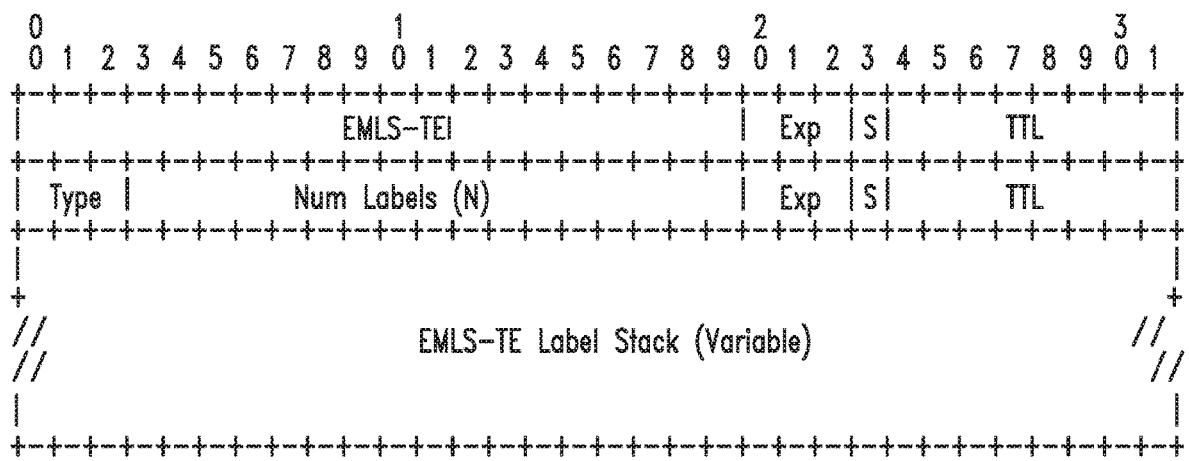
FIG. 5 depicts an example embodiment of an EMLS-TE used to encode node and adjacency labels along a stateless explicit path tree.

FIG. 5 depicts an example embodiment of an EMLS-TE used to encode node and adjacency labels along a stateless explicit path tree. The EMLS-TE 500 includes an EMLS-TE Indicator (EMLS-TEI) label, an EMLS-TE Descriptor label, and an EMLS-TE Label Stack.

The EMLS-TEI label is a special label configured to enable routers to unambiguously distinguish between EMLS-TE and non-EMLS-TE labels within an MPLS label stack. When EMLS-TE is embedded within a MPLS label stack consisting of "other" labels, a receiving router needs to be able to distinguish unambiguously between the EMLS-TE label and non-EMLS-TE labels. To accomplish this, the label immediately preceding an EMLS-TE may be the EMLS-TEI label, where preceding means closer to the top of the label stack (farther from bottom of stack indication). The EMLS-TEI label is a special label that is not expected to be used for any other purposes. The EMLS-TEI Label includes a 20-bit EMLS-TEI field, a 3-bit EXP field, a 1-bit S field (or S bit), and an 8-bit TTL field. The EMLS-TEI field of the EMLS-TEI label may have a special fixed value which may be reserved at the IANA registry on Special-purpose labels, or the value may be configured administratively across the stateless MPLS-TE multicast domain. The EXP and TTL fields in EMLS-TEI label are set to values as required for the packet. The sending router and receiving router of an EMLS-TE packet use the EXP field for mapping to the appropriate forwarding class. The originating router of the EMLS-TE may set the TTL to the maximum depth of the explicit path tree, to maximum value of 255, or the like. A receiving router decrements the TTL field by 1, while processing the EMLS-TE packet. The S bit is set to 0 since subsequent labels follow the EMLS-TEI label in the EMLS-TE.

Figure 6:
FIG. 6 depicts an example embodiment of an EMLS-TE Descriptor label used within an EMLS-TE.

The EMLS-TE Descriptor label follows the EMLS-TEI label in the EMLS-TE. The EMLS-TE Descriptor label is another special label that describes the type of EMLS-TE and the size of the EMLS-TE. So, the EMLS-TE Descriptor label does not carry a special fixed value. The EMLS-TE Descriptor label includes a 20-bit value which encodes the type of EMLS-TE and the number of subsequent labels in the EMLS-TE stack. It will be appreciated that the EMLS-TE Descriptor label may be formatted in various ways. In at least some example embodiments, the EMLS-TE Descriptor label may be formatted as depicted in FIG. 6. FIG. 6 depicts an example embodiment of an EMLS-TE Descriptor label used within an EMLS-TE. The EMLS-TE Descriptor label 600 includes a 3-bit Type Field, a 17-bit Number of Labels (Num Labels) field, a 3-bit EXP field, a 1-bit S field (or S bit), and an 8-bit TTL field. The 3-bit Type field encodes the type of EMLS-TE, which could allow up to 7 types. For example, a type 0x1 (or any other suitable value) may be used to indicate that the EMLS-TE Label Stack of the EMLS-TE includes node global labels and adjacency global labels of an explicit path tree. Herein, an EMLS-TE of type 0x1 is denoted as "EMLS-TE-1". The 17-bit Number of Labels field includes a value which indicates the number of subsequent labels that belong to the EMLS-TE. If the value is 'N' then the subsequent N labels (following the EMLS-TE Descriptor label) belong to the EMLS-TE. The originator of the EMLS-TE packet sets the EXP field to 0, and the receiver will ignore the value of this field. The S bit is set to 0. The TTL field is set to the TTL of the EMLS-TE packet.

The EMLS-TE Label Stack is the body of the EMLS-TE. The exact structure of the EMLS-TE Label Stack depends on the Type field in the EMLS-TE Descriptor label. In at least some example embodiments, the EMLS-TE Label Stack may be formatted as depicted in FIG. 7. FIG. 7 depicts an example embodiment of an EMLS-TE Label Stack for an EMLS-TE of type EMLS-TE-1. For EMLS-TE-1, the label stack includes the node global labels and adjacency global labels of the explicit path tree. The labels may be organized in any order. The general format of the label stack is illustrated in FIG. 7. In FIG. 7, the label stack consists of N number of node global labels and adjacency global labels. In each of the N labels which are used to encode the node global labels and adjacency global labels, the label value field is a 20-bit field that encodes a global label assigned to a node or an adjacency, and the EXP, S, and TTL fields field may be set to 0. It will be appreciated that a router that processes an EMLS-TE-1 packet will look up a label in the label stack in G-ILM, since the stack always carries global labels.

It will be appreciated that the formatting of an EMLS-TE-1 packet using an EMLS-TE-1 may be further understood by way of an example as depicted in FIG. 8.

FIG. 8 depicts an example of an EMLS-TE-1 packet for the explicit path tree of the MPLS TE multicast domain of FIG. 1. More specifically, FIG. 8 depicts the EMLS-TE-1={GL15, GL52, GL57, GL73, GL74, GL2, GL3, GL4, GL7} pushed by ingress router 111-1 into a packet of the exemplary multicast flow for the explicit path tree of the MPLS TE multicast domain of FIG. 1. The Type field in the EMLS-TE Descriptor label is set to 0x1 to indicate the type as EMLS-TE-1. There are 9 global labels in the Label Stack part, so the Number of Labels field in EMLS-TE Descriptor label is set to 9. The S bit in all labels, except the last label GL7, is set to 0, since those are not the last label in the stack. The S bit for GL7 is dependent on whether a non-EMLS-TE label follows after GL7.

It will be appreciated that the TEDB maintained by the network controller for the stateless MPLS TE multicast domain may be built in various ways. The network controller maintains the TEDB for the stateless MPLS TE multicast domain for TE resource management and for computation of explicit path trees based on QoS constraints. At a high-level, a TEDB includes the following components: (A) status and static TE metrics (e.g., bandwidth, delay, color, affinity, or the like) of each adjacency in the domain, and (B) TE resources reserved on the adjacencies by currently active explicit path trees. It will be appreciated that part B cannot exist without part A, as part A is the fundamental basis of the TEDB. The network controller may build part A using either or both of the following methods: (1) periodic polling on adjacency status and its static TE metrics or (2) participating in routing protocols (such as OSPF, OSPFv3, IS-IS, BGP-LS, or the like) that flood the status and static TE metrics for each adjacency in the network.

It will be appreciated that implementation of the stateless MPLS Multicast TE architecture that uses EMLS-TE-1 may be provided in various ways.

It will be appreciated that configuration of the global label space may be provided in various ways.

In at least some example embodiments, the global label space may be configured in a centralized entity, such as a network controller, that oversees management of the stateless MPLS TE multicast domain.

FIG. 9 depicts an example embodiment of a method for use by a network controller for configuration of a global label space at the network controller. It will be appreciated that, although primarily presented as being performed serially, at least a portion of the functions of method 900 may be performed contemporaneously or in a different order than as presented with respect to FIG. 9. The method 900 begins at block 901. The inputs to method 900 include (1) start_label, which is the label, in the global label space, from which to start and (2) size, which is the number of labels in the global label space, starting from the start_label. Block 902 sets up the Global Label Database at the network controller for management of global labels in the range {start_label, start_label+size}. From block 902, the method 900 proceeds to block 999, where the method 900 ends. It is noted that the recommended value of start_label is 0, so that various label compressions techniques may be applied to reduce the sizes of labels based on their values. Smaller label values lead to smaller sizes of labels. The size may be chosen to a value that would allow the maximum number of nodes and adjacencies in the stateless MPLS TE multicast domain.

It will be appreciated that configuration of the global label space may be provided in various other ways.

It will be appreciated that configuration of global labels of the global label space in a network may be provided in various ways.

In at least some example embodiments, for each router in the stateless MPLS TE multicast domain, the network controller allocates the following labels from the global label space and configures the labels into the forwarding plane of the router: (1) a node global label that identifies the router and (2) an adjacency global label for each forward connected adjacency in the router.

FIG. 10 depicts an example embodiment of a method for use by a network controller for configuration of global labels in a network. It will be appreciated that, although primarily presented as being performed serially, at least a portion of the functions of method 1000 may be performed contemporaneously or in a different order than as presented with respect to FIG. 10. The method 1000 begins at block 1001. Block 1002 retrieves the first router in the stateless MPLS multicast TE domain. The method 1000 then proceeds to block 1004. Block 1004 allocates the node global label and adjacency global labels for the router from the global label space and configures the node global label and adjacency global labels for the router into the forwarding plane of the router with the appropriate node or adjacency context. The method 1000 then proceeds to block 1006. Block 1006 checks if there are more routers in the domain. If there are no more routers in the domain, then the method 1000 proceeds to block 1099 where the method 1000 ends. If there are more routers in the domain, then the method 1000 proceeds to block 1008. Block 1008 retrieves the next router in the domain. The method 1000 then returns to block 1004 and subsequent blocks are repeated for the next router.

FIG. 11 depicts an example embodiment of a method for use by a network controller for configuration of global labels in a router. It will be appreciated that the method 1100 of FIG. 11 may be used as block 1004 of FIG. 10. It will be appreciated that, although primarily presented as being performed serially, at least a portion of the functions of method 1100 may be performed contemporaneously or in a different order than as presented with respect to FIG. 11. The method 1100 begins at block 1101. Block 1102 checks if there is a free label in the global label space for allocation of a node global label to the router. If a free label is available in the global label space, then the method 1100 proceeds to block 1104; otherwise the method 1100 proceeds to block 1120. Block 1104 allocates a node global label, from the global label space, to identify the router. The method 1100 then proceeds to block 1106. Block 1106 configures the node global label into the router (e.g., sends the configuration command/message to the router to perform the local action needed in the router, or the like). The method 1100 then proceeds to block 1108. Block 1108 retrieves the first forward connected adjacency in the router. Here, the adjacency means the adjacency within the stateless MPLS TE multicast domain. It is noted that there must be at least one adjacency in the router in order to be connected in the stateless MPLS TE multicast domain. It is further noted that the network controller already has the database of node and adjacency addresses of every router in the domain in its TEDB. The method 1100 then proceeds to block 1110. Block 1110 checks if there is a free label in the global label space for allocation of the adjacency global label to the adjacency. If a free label is available, then the method 1100 proceeds to block 1112; otherwise, the method 1100 proceeds to block 1120. Block 1112 allocates an adjacency global label, from the global label space, to identify the adjacency in the router. The method 1100 then proceeds to block 1114. Block 1114 configures the adjacency global label into the router (e.g., sends the configuration command/message to the router to perform the local action needed in the router, or the like). The method 1100 then proceeds to block 1116. Block 1116 checks if there are more adjacencies in the router. If there are no more adjacencies in the router, then the method 1100 proceeds to block 1199 where the method 1100 ends; otherwise, the method 1100 proceeds to block 1118. Block 1118 retrieves the next adjacency in the router. The method 1100 then returns to block 1112 to repeat the subsequent blocks for the next adjacency. Block 1120 handles a label allocation failure from the global label space. The handling may declare an error and/or may take rollback actions (e.g., deconfigure partial configurations in a router or in the network) or the like. From block 1120, the method 1100 proceeds to block 1199 where the method 1100 ends.

Figure 12:
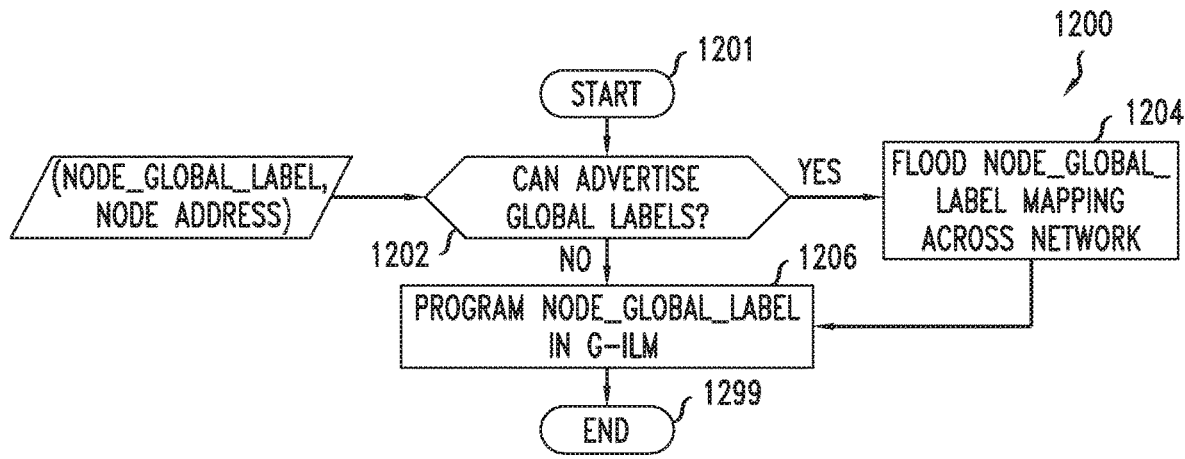
FIG. 12 depicts an example embodiment of a method for use by router for configuration of a node global label at the router.

FIG. 12 depicts an example embodiment of a method for use by router for configuration of a node global label at the router. It will be appreciated that the method 1200 of FIG. 12 may be used as block 1106 of FIG. 11. It will be appreciated that, although primarily presented as being performed serially, at least a portion of the functions of method 1200 may be performed contemporaneously or in a different order than as presented with respect to FIG. 12. The method 1200 begins at block 1201. The inputs to method 1200 include a node global label which is the node global label allocated from global label space and a node address which is a network-wide unique address of the node to which the node global label is assigned. For example, in an IP network, the node address could be a loopback IP address in the router. Block 1202 checks if the network is configured with a routing protocol to advertise the mapping of global labels to respective addresses in the router. If a routing protocol is configured, then the method 1200 proceeds to block 1204; otherwise, the method 1200 proceeds to block 1206. Block 1204 advertises the mapping of the node global label to the node address, via the routing protocol, to all neighbor routers in the domain. The neighbor routers, in turn, will advertise the mapping to their neighbors and, thus, the label mapping gets flooded across the domain. The method 1200 then proceeds to block 1206. Block 1206 programs the node global label in the G-ILM in the forwarding plane. The NHLFE of the label entry in G-ILM is programmed with the forwarding context as "self", which means this is the egress router for the label. From block 1206, the method 1200 proceeds to block 1299 where the method 1200 ends.

Figure 13:
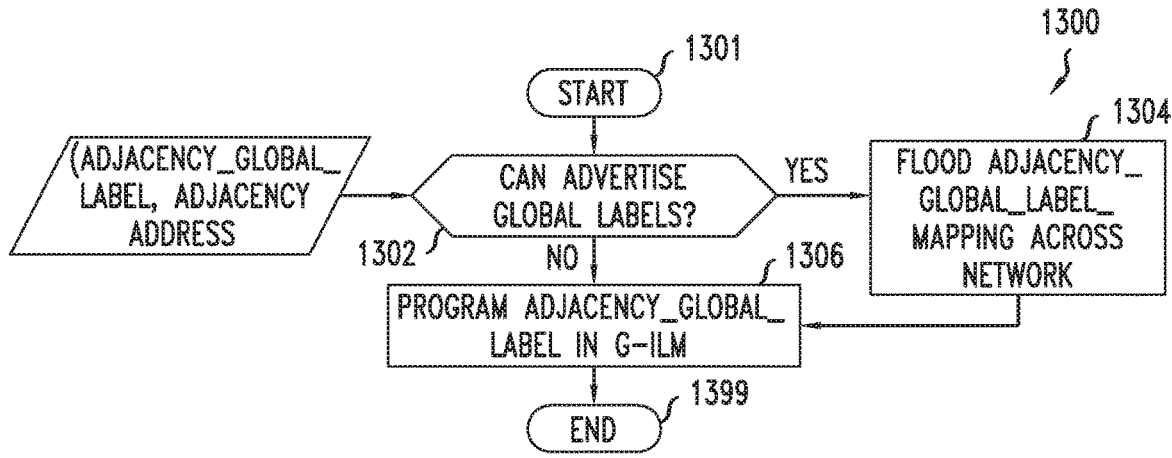
FIG. 13 depicts an example embodiment of a method for use by router for configuration of an adjacency global label at the router.

FIG. 13 depicts an example embodiment of a method for use by router for configuration of an adjacency global label at the router. It will be appreciated that the method 1300 of FIG. 13 may be used as block 1114 of FIG. 11. It will be appreciated that, although primarily presented as being performed serially, at least a portion of the functions of method 1300 may be performed contemporaneously or in a different order than as presented with respect to FIG. 13. The method 1300 begins at block 1301. The inputs to method 1300 include an adjacency global label which is the adjacency global label allocated from global label space and an adjacency address which is a network-wide unique address of the adjacency to which the adjacency global label is assigned. For example, in an IP network, the adjacency address could be the pair of local IP address on the adjacency in this router and the remote IP address on the adjacency in the neighbor router. Block 1302 checks if the network is configured with a routing protocol to advertise the mapping of global labels to respective addresses in the router. If a routing protocol is configured, then the method 1300 proceeds to block 1304; otherwise, the method 1300 proceeds to block 1306. Block 1304 advertises the mapping of the adjacency global label to the adjacency address, via the routing protocol, to all neighbor routers in the domain. The neighbor routers, in turn, will advertise the mapping to their neighbors and, thus, the label mapping gets flooded across the domain. The method 1300 then proceeds to block 1306. Block 1306 programs the adjacency global label in the G-ILM in the forwarding plane. The NHLFE of the label entry in G-ILM is programmed with the forwarding context as the adjacency. From block 1306, the method 1300 proceeds to block 1399 where the method 1300 ends.

It will be appreciated that configuration of global labels of the global label space in a network may be provided in various other ways.

It will be appreciated that configuration of an explicit path tree based on the global label space may be provided in various ways.

In at least some example embodiments, when a multicast flow with a required QoS is setup by an ingress router, it triggers configuration of the explicit path tree that would meet the QoS of the flow. The ingress router sends a tree computation request to the network controller for the set of egress routers of the flow and the required QoS. In the tree computation request, the ingress router also includes an indication of whether or not it intends to receive the explicit path tree in the form of (1) node addresses and adjacency addresses of the explicit path tree (e.g., where the ingress router is able to map the addresses to the node global labels and adjacency global labels, such as where the network is enabled for flooding of node and adjacency global label mappings via routing protocols) or (2) node global labels and adjacency global labels (e.g., where the ingress router is unable to map the addresses to the node global labels and adjacency global labels, such as where the network is not enabled for flooding of node and adjacency global label mappings via routing protocols or is enabled for such flooding but the ingress router does not have the node global labels and adjacency global labels needs for the explicit path tree). The network controller, on receipt of the tree computation request computes the explicit path tree based on the TEDB, such that the explicit path tree meets the required QoS. The network controller updates the dynamic TE metrics (e.g., available bandwidth or the like) of the adjacencies along the explicit path tree based on the QoS resources reserved by the explicit path tree. The network controller also records the explicit path tree in its database and responds to the ingress router with the explicit path tree in the form of the node and adjacency addresses or the node and adjacency labels, as per the choice stated in the tree computation request. When ingress router receives the explicit path tree from the network controller, the configuration process of the explicit tree is complete and any packet on the multicast flow is then sent along the explicit path tree.

It will be appreciated that various functions discussed hereinabove may be provided using various methods discussed hereinbelow.

Figure 14:
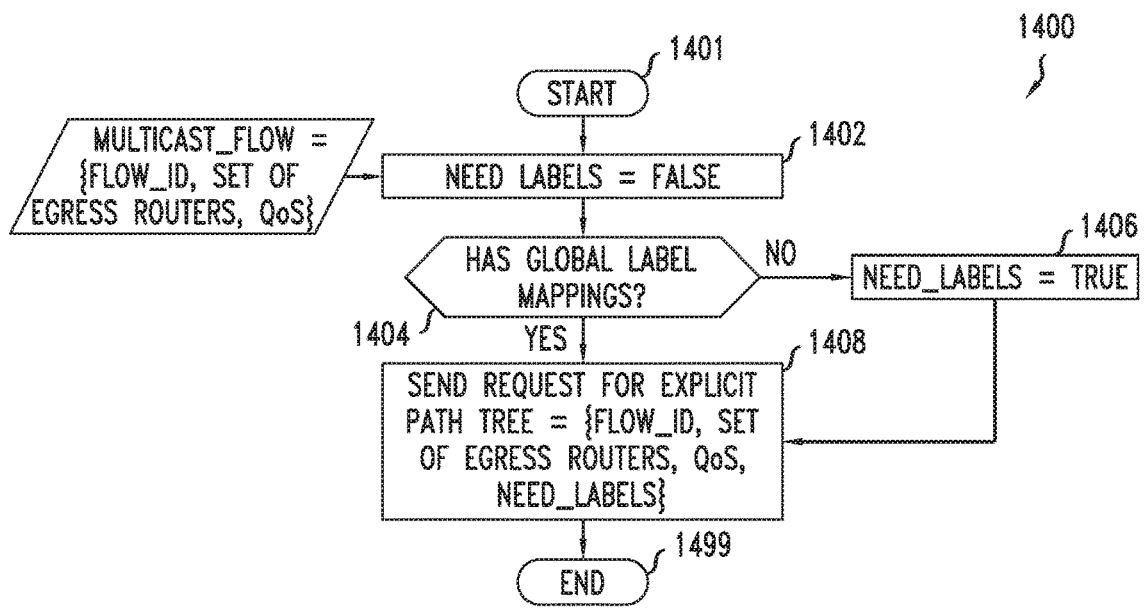
FIG. 14 depicts an example embodiment of a method for use by an ingress router for triggering configuration of an explicit path tree.

FIG. 14 depicts an example embodiment of a method for use by an ingress router for triggering configuration of an explicit path tree. It will be appreciated that, although primarily presented as being performed serially, at least a portion of the functions of method 1400 may be performed contemporaneously or in a different order than as presented with respect to FIG. 14. The method 1400 begins at block 1401. The inputs to method 1400 are a locally assigned identifier for a multicast flow, the set of egress routers, and the required QoS of a multicast flow. The method begins at block 1401. Block 1402 initializes a variable 'Need Labels' to false. This variable is used to track whether the ingress router is going to ask the network controller for the global labels of the nodes and adjacencies in the explicit path tree. The method 1400 then proceeds to block 1404. Block 1404 checks whether the router has the global label mappings database, built from advertisements by routing protocols, for the entire network. If the database does not exist at the ingress router, then the method 1400 proceeds to block 1406; otherwise, the method 1400 proceeds to block 1408. Block 1406 sets the variable 'Need Labels' to true, because the ingress router does not have the global label mappings for the network. The method 1400 then proceeds to block 1408. Block 1408 sends a request for an explicit multicast tree to the network controller. The request includes the multicast flow identifier, the set of egress routers, the required QoS, and an indication as to whether the ingress router needs the global labels (based on the 'Need Labels' variable). From block 1408, the method 1400 proceeds to block 1499 where the method 1400 ends.

Figure 15:
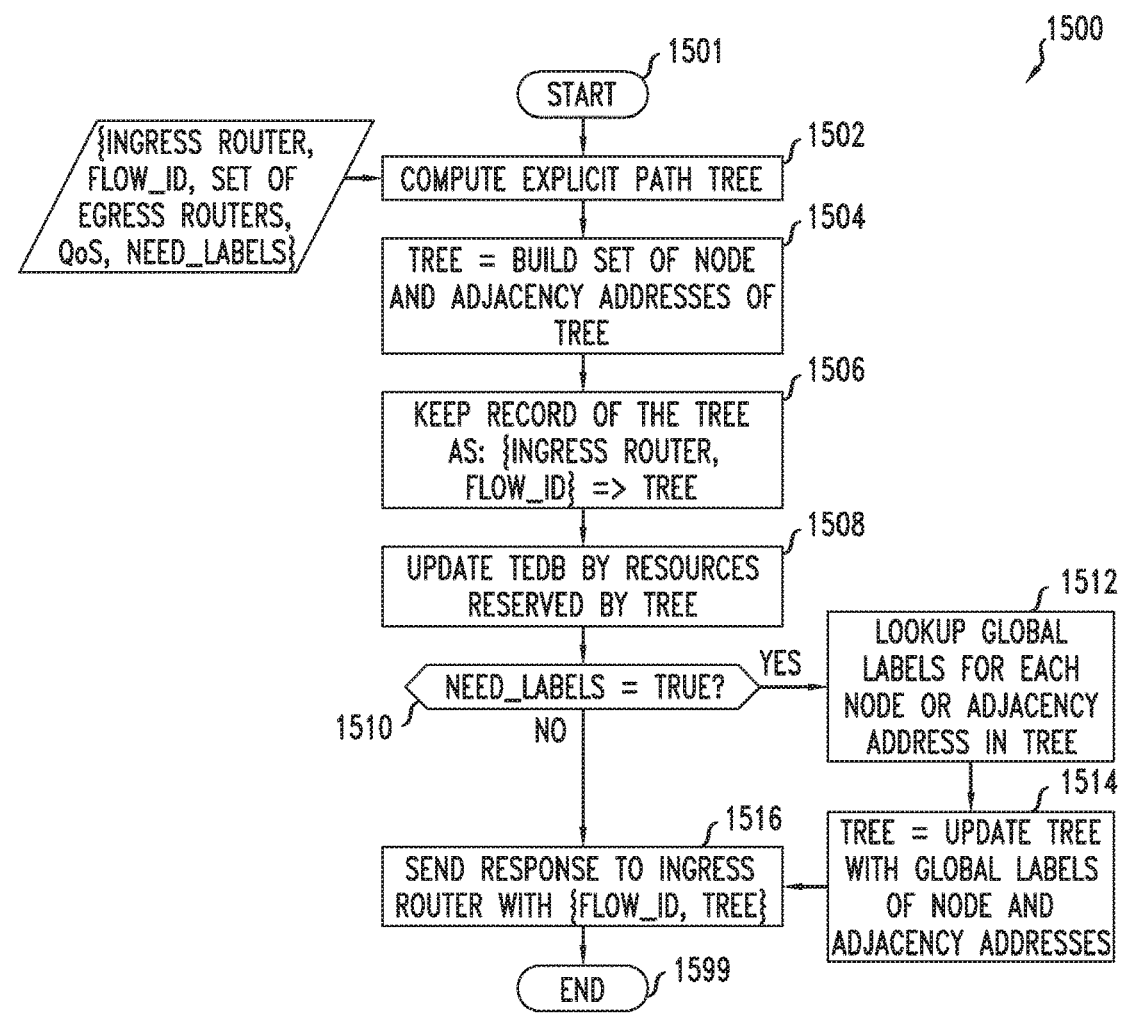
FIG. 15 depicts an example embodiment of a method for use by a network controller for processing an explicit path tree request from an ingress router.

FIG. 15 depicts an example embodiment of a method for use by a network controller for processing an explicit path tree request from an ingress router. It will be appreciated that, although primarily presented as being performed serially, at least a portion of the functions of method 1500 may be performed contemporaneously or in a different order than as presented with respect to FIG. 15. The method 1500 begins at block 1501. The inputs to method 1500 are the ingress router that sent the request, the multicast flow identifier assigned by the ingress router, set of egress routers of the multicast flow, a set of parameters describing QoS required by the multicast flow, and an indication as to whether global label mappings are needed by ingress router for the nodes and adjacencies of the explicit path tree. The method 1500 then proceeds to block 1502. Block 1502 computes the explicit path tree based on TEDB and the requested QoS parameters. It will be appreciated that various explicit path tree computation algorithms may be applied for computation of explicit path tree based on QoS constraints. The method 1500 then proceeds to block 1504. Block 1504 builds the explicit path tree to be sent to the ingress router, as the "ordered set" of nodes and adjacency addresses resulting from the computation at block 1502. Here, "ordered set" means that nodes and adjacencies are ordered in the set according to their occurrences along the explicit path tree. It will be appreciated that, when a subset of adjacencies forms branches at a transit router, those adjacencies can be put in any order within the subset. The method 1500 then proceeds to block 1506. Block 1506 keeps a record of the mapping of {ingress router, multicast flow identifier} to the explicit path tree. The method 1500 then proceeds to block 1508. Block 1508 reserves the QoS resources used by the explicit path tree in the TEDB. For example, available bandwidth of the adjacencies used by the tree are updated in the TEDB after deduction of the bandwidth reserved by the explicit path tree. The method 1500 then proceeds to block 1510. Block 1510 determines whether the ingress router requested the global label mappings of the nodes and adjacency addresses of the explicit path tree. If the ingress router requested the global label mappings of the nodes and adjacency addresses of the explicit path tree, then the method 1500 proceeds to block 1512; otherwise, the method 1500 proceeds to block 1516. Block 1512 looks up the global label assignments to the nodes and adjacency addresses of the explicit path tree, in the global label space database of the network controller. The method 1500 then proceeds to block 1514. Block 1514 updates the explicit path tree by including the global labels along with the respective nodes and adjacency addresses. The method then proceeds to block 1516. Block 1516 sends the response to the ingress router with the multicast flow identifier and the explicit path tree. From block 1516, the method 1500 proceeds to block 1500 where the method 1500 ends.

Figure 16:
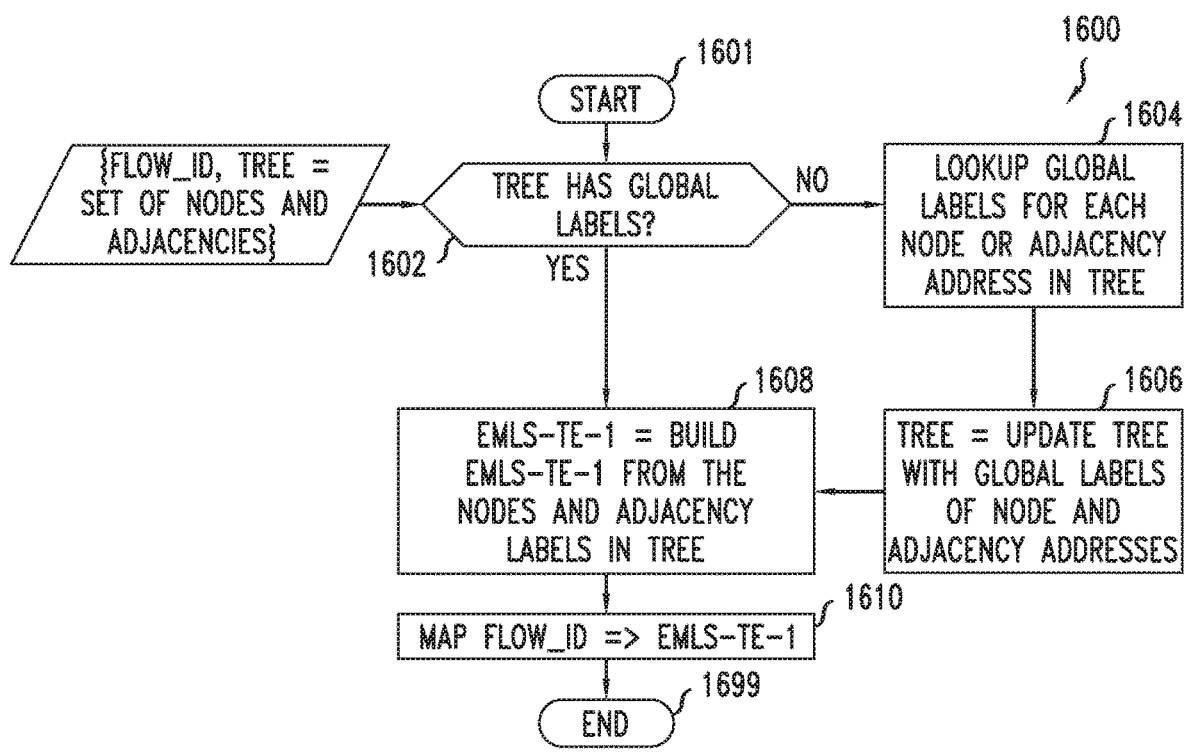
FIG. 16 depicts an example embodiment of a method for use by an ingress router for processing a response from a network controller for a computed explicit path tree.

FIG. 16 depicts an example embodiment of a method for use by an ingress router for processing a response from a network controller for a computed explicit path tree. It will be appreciated that, although primarily presented as being performed serially, at least a portion of the functions of method 1600 may be performed contemporaneously or in a different order than as presented with respect to FIG. 16. The method 1600 begins at block 1601. The inputs to method 1600 are the local identifier of a multicast flow in the ingress router and the explicit path tree with its set of nodes and adjacencies. The method 1600 then proceeds to block 1602. Block 1602 checks if the explicit path tree already has global label mappings to the nodes and adjacencies (e.g., the ingress router may have requested the mappings from the network controller). If global label mappings are not found, then the method 1600 proceeds to block 1604; otherwise, the method 1600 proceeds to block 1608. Block 1604 looks up the global label mapping for each node and adjacency address in the explicit path tree in the global label mapping database of the router that is built by the routing protocols. The method 1600 then proceeds to block 1606. Block 1606 updates the explicit path tree by adding the global labels of each node and adjacency address in the explicit path tree. The method 1600 then proceeds to block 1608. Block 1608 builds the EMLS-TE-1 from the node labels and adjacency labels in the explicit path tree. The method 1600 then proceeds to block 1610. Block 1610 maps the EMLS-TE-1 to the multicast flow identifier. That means any packet to be multicast by the ingress router for the flow must use this EMLS-TE-1. This completes the configuration of the explicit path tree for the multicast flow at the ingress router. From block 1610, the method 1600 proceeds to block 1699 where method 1600 ends.

Figure 17:
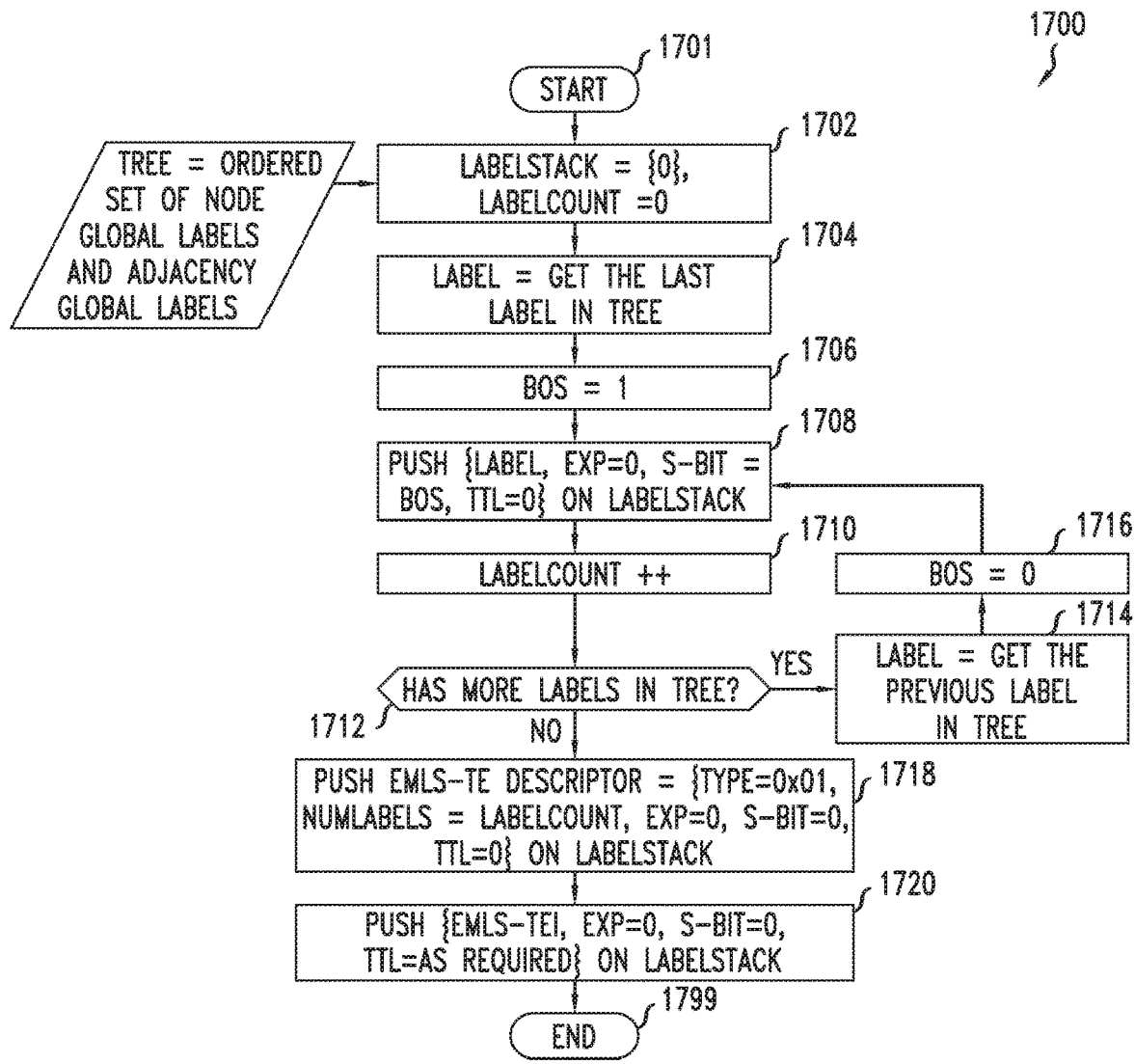
FIG. 17 depicts an example embodiment of a method for use by an ingress router for building an EMLS-TE-1 for a set of node global labels and adjacency global labels in an explicit path tree.

FIG. 17 depicts an example embodiment of a method for use by an ingress router for building an EMLS-TE-1 for a set of node global labels and adjacency global labels in an explicit path tree. It will be appreciated that the method 1700 of FIG. 17 may be used as block 1608 of FIG. 16. It will be appreciated that, although primarily presented as being performed serially, at least a portion of the functions of method 1700 may be performed contemporaneously or in a different order than as presented with respect to FIG. 17. The method 1700 begins at block 1701. The inputs to method 1700 are the ordered set of node global labels and adjacency global labels of the explicit path tree. The method 1700 then proceeds to block 1702. Block 1702 initializes an empty label stack and a variable LabelCount to track the total number of node global labels and adjacency global labels to be pushed into the label stack. The label stack would eventually be the EMLS-TE-1. The method 1700 then proceeds to block 1704. Block 1704 retrieves the last label from the ordered set of input labels (i.e., in reverse order). The method 1700 then proceeds to block 1706. Block 1706 initializes a local variable BOS (Bottom-Of-the-Stack) to a value of 1. The BOS will be encoded as the S-bit in the labels pushed into the stack. BOS is initialized to 1 because the current label that is going to be pushed onto the label stack is the last label in the stack. The method 1700 then proceeds to block 1708. Block 1708 pushes the label into the label stack with setting the EXP field as 0, S-bit as BOS, and TTL as 0. The method 1700 then proceeds to block 1710. Block 1710 increments LabelCount by one, a label has been pushed onto the label stack. The method 1700 then proceeds to block 1712. Block 1712 checks if there are more labels in the ordered set of input labels. If there are more labels in the ordered set of input labels, then the method 1700 proceeds to block 1714; otherwise, the method 1700 proceeds to block 1718. Block 1714 retrieves the previous label of the recently pushed label from the ordered set of input labels. The method 1700 then proceeds to block 1716. Block 1716 sets value of BOS to 0, since the next label to be pushed is not the last label in the label stack. The method 1700 then returns to block 1708 to iterate the subsequent blocks for this label. Block 1718, which is reached when all of the labels in the ordered set of input labels have been pushed onto the label stack, pushes the EMLS descriptor with Type field set to 0x01 (to indicate EMLS-TE-1), NumLabels field set to value of LabelCount, EXP as 0, S-bit as 0, and TTL as 0. The method 1700 then proceeds to block 1720. Block 1720 pushes the EMLS-TEI into the label stack with EXP as 0, S-bit as 0, and TTL as required. Regarding TTL, for example, an implementation may choose to set the TTL to the maximum depth of the explicit path tree, may choose to set to maximum value 255, or the like. The EXP is kept as 0, because a packet pushed with a copy of this EMLS-TE-1 will set the EXP on the copy based on its required QoS. The label stack is now the EMLS-TE-1. From block 1720 the method 1700 proceeds to block 1799, where the method 1700 ends.

It will be appreciated that configuration of an explicit path tree based on the global label space may be provided in various other ways.

It will be appreciated that origination of an EMLS-TE-1 packet may be provided in various ways.

Figure 18:
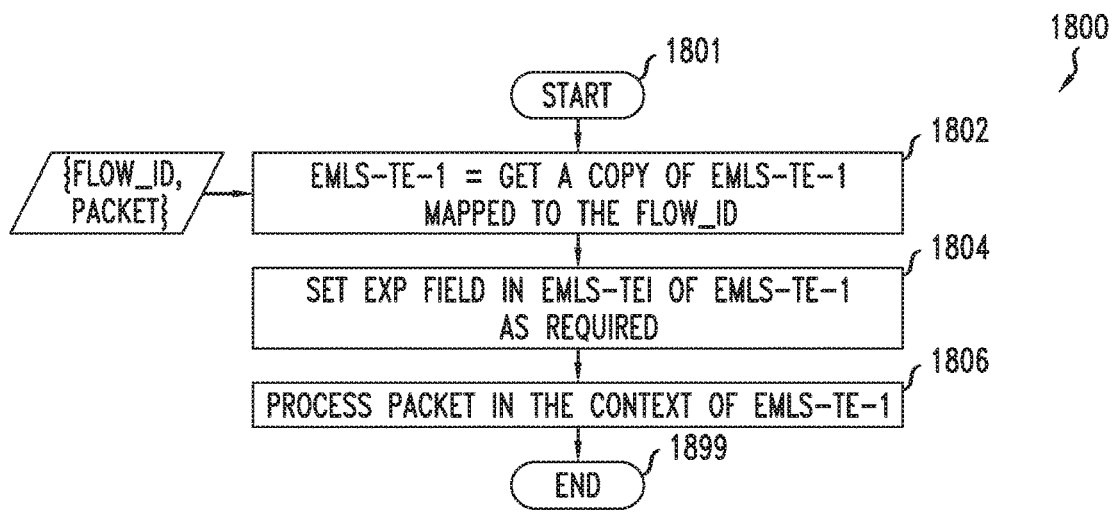
FIG. 18 depicts an example embodiment of a method for use by an ingress router for originating an EMLS-TE-1 packet.

FIG. 18 depicts an example embodiment of a method for use by an ingress router for originating an EMLS-TE-1 packet. It will be appreciated that the method 1900 may be used to send a packet for a multicast flow as an EMLS-TE-1 packet across a stateless MPLS TE multicast domain. It will be appreciated that, although primarily presented as being performed serially, at least a portion of the functions of method 1800 may be performed contemporaneously or in a different order than as presented with respect to FIG. 18. The method 1800 begins at block 1801. The inputs to method 1800 are the locally assigned identifier of the multicast flow and a packet of the flow. The method 1900 then proceeds to block 1902. Block 1802 looks up the EMLS-TE-1 mapped to the multicast flow by its identifier and makes a copy of the EMLS-TE-1. The method 1800 then proceeds to block 1804. Block 1804 sets the EXP field in EMLS-TEI as required. For example, an implementation may determine the EXP based on the QoS policy associated with the multicast flow. It also sets the TTL field in the EMLS-TEI as required. For example, an implementation may choose to set the TTL to the maximum depth of the explicit path tree. The method 1800 then proceeds to block 1806. Block 1806 sends the packet to stateless MPLS multicast TE domain in the context of the EMLS-TE-1.

Figure 19A:
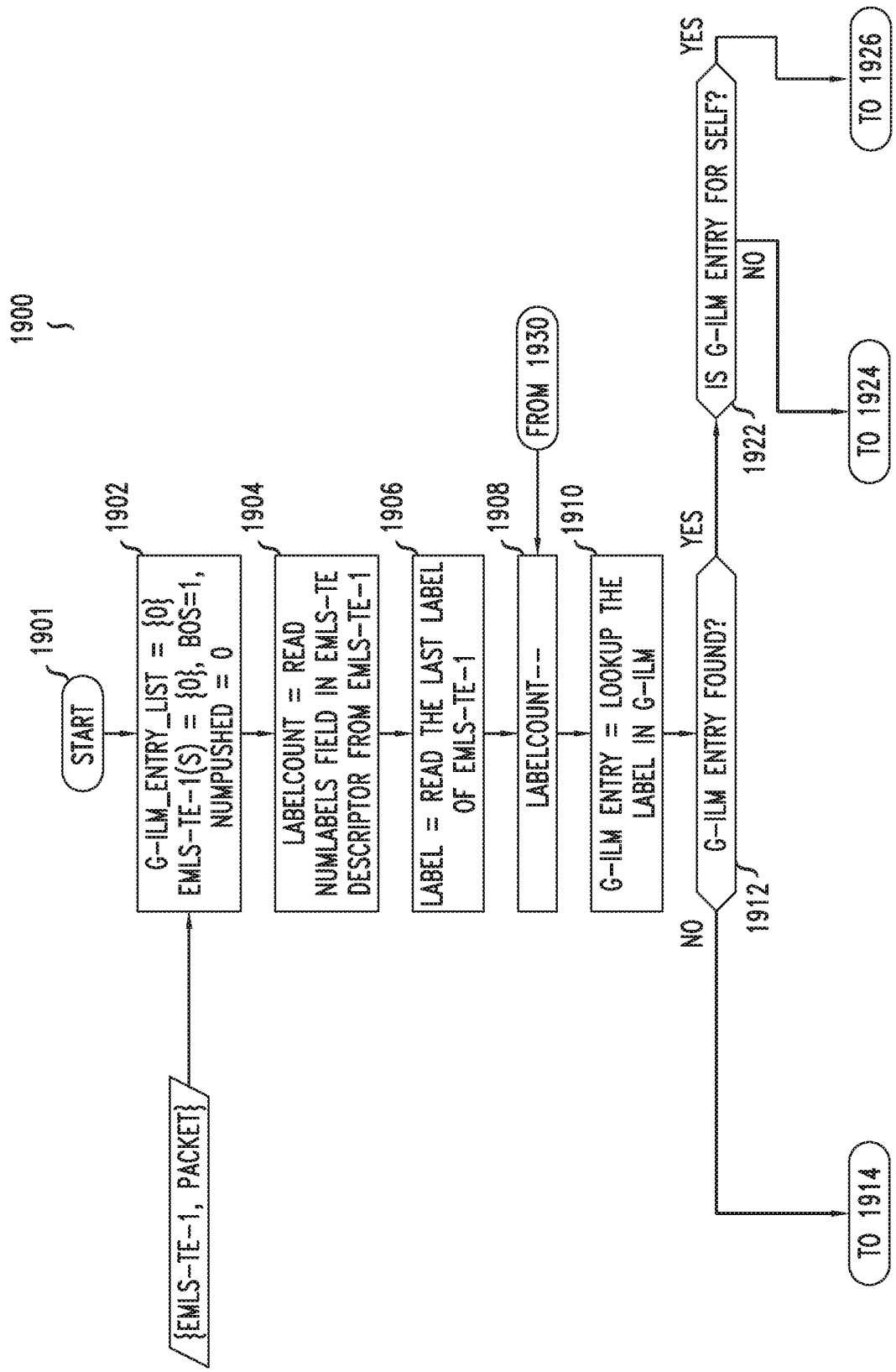
FIGS. 19A and 19B depict an example embodiment of a method for use by a router for processing a packet in the context of an EMLS-TE-1.
Figure 19B:
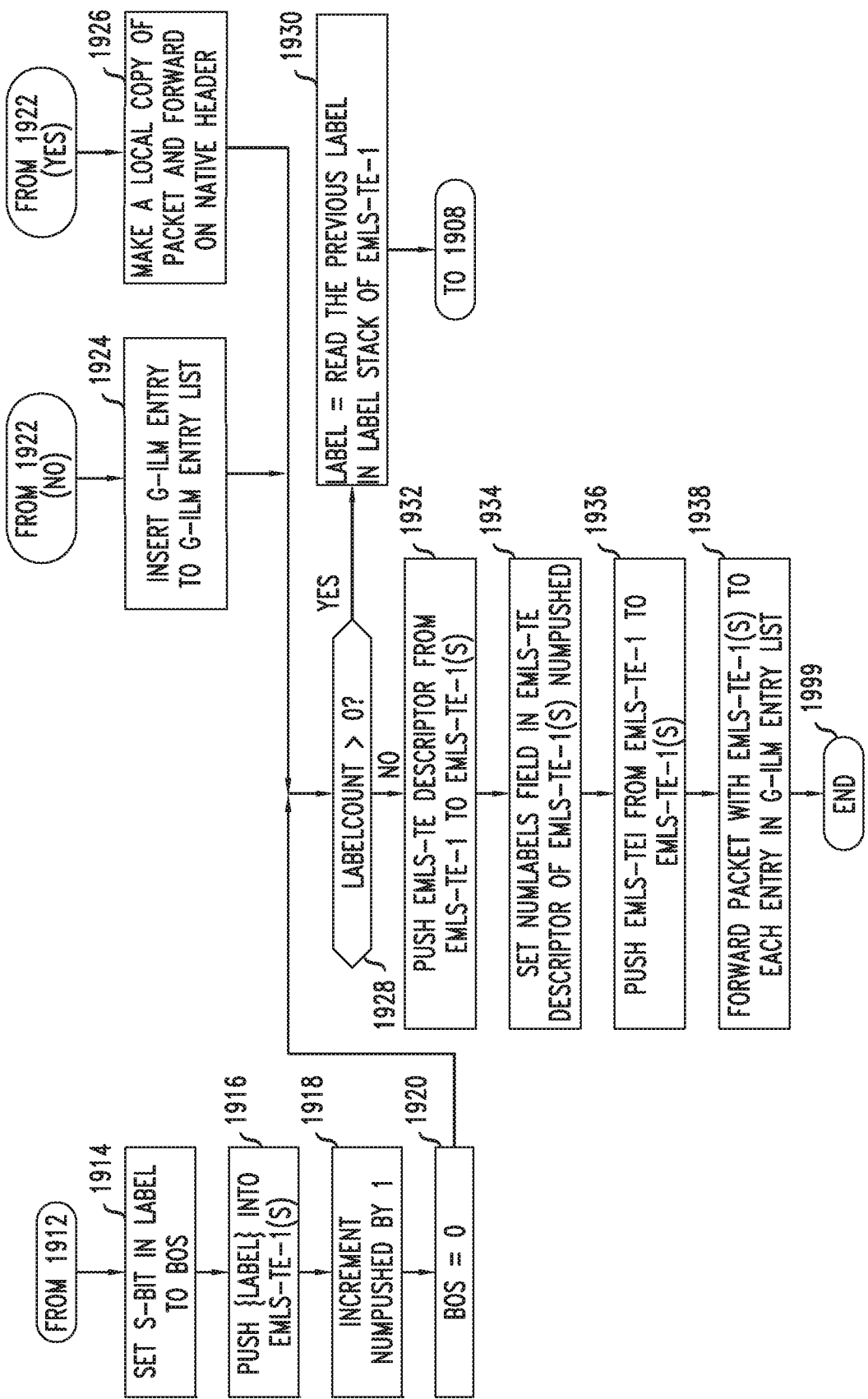

FIGS. 19A and 19B depict an example embodiment of a method for use by a router for processing a packet in the context of an EMLS-TE-1. It will be appreciated that the method 1900 of FIGS. 19A and 19B may be executed by all types of routers within a stateless MPLS TE multicast domain (e.g., ingress, transit, leaf, and bud routers). It will be appreciated that the method 1900 of FIGS. 19A and 19B may be used as block 1806 of FIG. 18. It will be appreciated that, although primarily presented as being performed serially, at least a portion of the functions of method 1900 may be performed contemporaneously or in a different order than as presented with respect to FIGS. 19A and 19B.

The method 1900 begins at block 1901. The inputs to method 1900 are EMLS-TE-1 and the packet. The method 1900 then proceeds to block 1902.

Block 1902 performs a set of initializations. Block 1902 initializes an empty list of G-ILM entries, where this list is to be used to temporarily track G-ILM entries for the labels in the EMLS-TE-1 that has forward connected adjacency states in this router. Block 1902 initializes an empty EMLS-TE-1, which is denoted as EMLS-TE-1(S). EMLS-TE-1(S) would be pushed onto the forwarded packet(s), so it is qualified with "S" to indicate "to send". The EMLS-TE-1(S) will eventually contain all labels from the label stack of the input EMLS-TE-1, except the ones that identifies a forward connected adjacency or the node itself. Block 1902 initializes a variable BOS (Bottom-Of-the-Stack) to 1. BOS is used to track the S-bit for the labels to be pushed onto EMLS-TE-1. Since the label pushed first is always at the bottom of the stack, so BOS is initialized to 1. Block 1902 initializes a variable NumPushed, that tracks the number of labels pushed into EMLS-TE-1(S), to 0. The method 1900 then proceeds to block 1904.

Block 1904 reads the NumLabels field from the EMLS-TE Descriptor of the input EMLS-TE-1 (i.e., the second label in EMLS-TE-1) to the local variable LabelCount. The method 1900 then proceeds to block 1906. Block 1906 reads the last global label in the label stack of EMLS-TE-1, starting from last label (i.e., reverse order) so that labels would be pushed onto EMLS-TE-1(S) in the same order as in input EMLS-TE-1. The method 1900 then proceeds to block 1908. Block 1908 decrements the LabelCount, as one label has been read out from the EMLS-TE-1. The method 1900 then proceeds to block 1910. Block 1910 looks up the label in G-ILM. The method 1900 then proceeds to block 1912. Block 1912 checks if a G-ILM entry has been found. If a G-ILM entry has not been found, then the method 1900 proceeds to block 1914; otherwise, the method 1900 proceeds to block 1922.

Block 1914 sets the S-bit in the current label to the value of BOS. The method 1900 then proceeds to block 1916. Block 1916 pushes the current label onto EMLS-TE-1(S). The method 1900 then proceeds to block 1918. Block 1918 increments the value of NumPushed by one, as a global label has been pushed onto EMLS-TE-1(S). The method 1900 then proceeds to block 1920. Block 1920 sets the value of BOS to 0 because subsequent labels to be pushed will not be the last label in EMLS-TE-1(S). The method 1900 then proceeds to block 1928.

Block 1922 checks if the forwarding context of the G-ILM entry indicates "self", which means this router is an egress router of the packet. If it is egress router, then the method 1900 proceeds to block 1926; otherwise, the method 1900 proceeds to 1924. Block 1926 makes a copy of the input packet and forwards the copy based on the native header in the packet copy, and the method 1900 then proceeds to block 1928. Block 1924 inserts the G-ILM entry into the temporal list of G-ILM entries, and the method 1900 then proceeds to block 1928.

Block 1928 checks if there are more labels to process in the label stack of EMLS-TE-1, which is indicated by Label-Count having a value greater than zero. If there are more labels to process in the label stack of EMLS-TE-1, then the method 1900 proceeds to block 1930; otherwise, the method proceeds to block 1932. Block 1930 reads the label previous to the current label (since we are reading the labels in reverse order) in the label stack of EMLS-TE-1, and the method 1900 then returns to block 1908 to repeat the subsequent blocks for this label. Block 1932, which is reached when all non-local global labels have been pushed onto EMLS-TE-1(S), reads the EMLS-TE Descriptor from the input EMLS-TE-1 and pushes the EMLS-TE Descriptor onto EMLS-TE-1(S). The method 1900 then proceeds to block 1934. Block 1934 sets the NumLabels field in EMLS-TE Descriptor of EMLS-TE-1(S) to the value of NumPushed. The method 1900 then proceeds to block 1936. Block 1936 reads the EMLS-TEI from EMLS-TE-1 and pushes the EMLS-TEI onto EMLS-TE-1(S). The method 1900 then proceeds to block 1938. Block 1938 walks through the entries in the temporal list of G-ILM entries, and for each entry, it makes a copy of the packet, pushes the EMLS-TE-1(S) onto the packet copy and forwards the resultant EMLS-TE-1 packet on the adjacency of that entry. The method 1900 then proceeds to block 1999, where the method 1900 ends.

Figure 20:
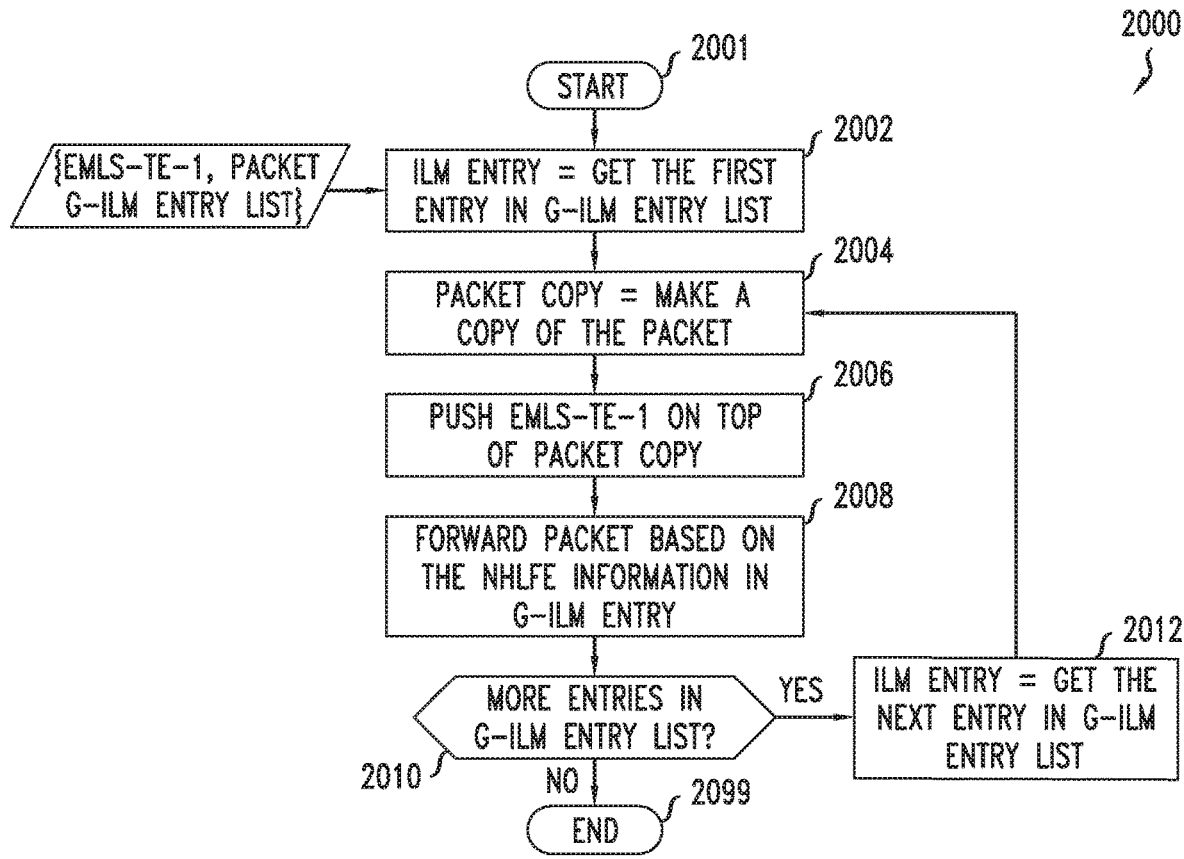
FIG. 20 depicts an example embodiment of a method for use by a router for forwarding of EMLS-TE-1 packets.

FIG. 20 depicts an example embodiment of a method for use by a router for forwarding of EMLS-TE-1 packets. It will be appreciated that the method 2000 of FIG. 20 may be executed by all types of routers within a stateless MPLS TE multicast domain (e.g., ingress, transit, leaf, and bud routers). It will be appreciated that the method 2000 of FIG. 20 may be used as block 1938 of method 1900 of FIGS. 19A and 19B. It will be appreciated that, although primarily presented as being performed serially, at least a portion of the functions of method 2000 may be performed contemporaneously or in a different order than as presented with respect to FIG. 20.

The method 2000 begins at block 2001. The inputs to method 2000 are the packet, the EMLS-TE-1 to be pushed onto the packet, and the list of G-ILM entries on which to forward a copy of the EMLS-TE-1 packet. Block 2002 retrieves the first G-ILM entry from the input list of G-ILM entries. The method 2000 then proceeds to block 2004. Block 2004 makes a copy of the input packet. The method 2000 then proceeds to block 2006. Block 2006 pushes a copy of input EMLS-TE-1 on top of the packet copy, which results in an EMLS-TE-1 packet. The method 2000 then proceeds to block 2008. Block 2008 forwards the EMLS-TE-1 to the adjacency associated with the G-ILM entry, based on the NHLFE of the G-ILM entry. The method 2000 then proceeds to block 2010. Block 2010 checks if there are more G-ILM entries in the list. If no more G-ILM entries are left in the list, then the method 2000 proceeds to block 2099 where the method 2000 ends. If at least one more G-ILM entry is left in the list, the method 2000 proceeds to block 2012. Block 2012 retrieves the next G-ILM entry in the list of G-ILM entries, and the method 2000 then returns to block 2004 to repeat blocks 2004-2008 for the next G-ILM entry.

It is noted that, as indicated above, the method 2000 of FIG. 20 may be used as block 1938 of method 1900 of FIGS. 19A and 19B. It is noted that, in some cases, performing blocks to 1902 to 1936 in method 1900 of FIGS. 19A and 19B on each packet for a multicast flow may be sub-optimal, as the operations therein are not specific to a packet, but, rather, are for the multicast flow in general. Accordingly, in at least some embodiments, the blocks 1902 to 1936 may be performed in continuation to the method in FIG. 17, to prebuild the list of G-ILM entries and the EMLS-TE-1 to be sent on forwarded packets. Then, the multicast flow identifier can be mapped to the tuple {EMLS-TE-1, list of G-ILM entries}. For every packet on the multicast flow, the ingress router will then look up the {EMLS-TE-1, list of G-ILM entries} mapped to the flow identifier and execute the method 2000 to forward/replicate the packet.

It will be appreciated that origination of an EMLS-TE-1 packet may be provided in various other ways.

It will be appreciated that processing of an EMLS-TE-1 packet may be provided in various ways.

Figure 21:
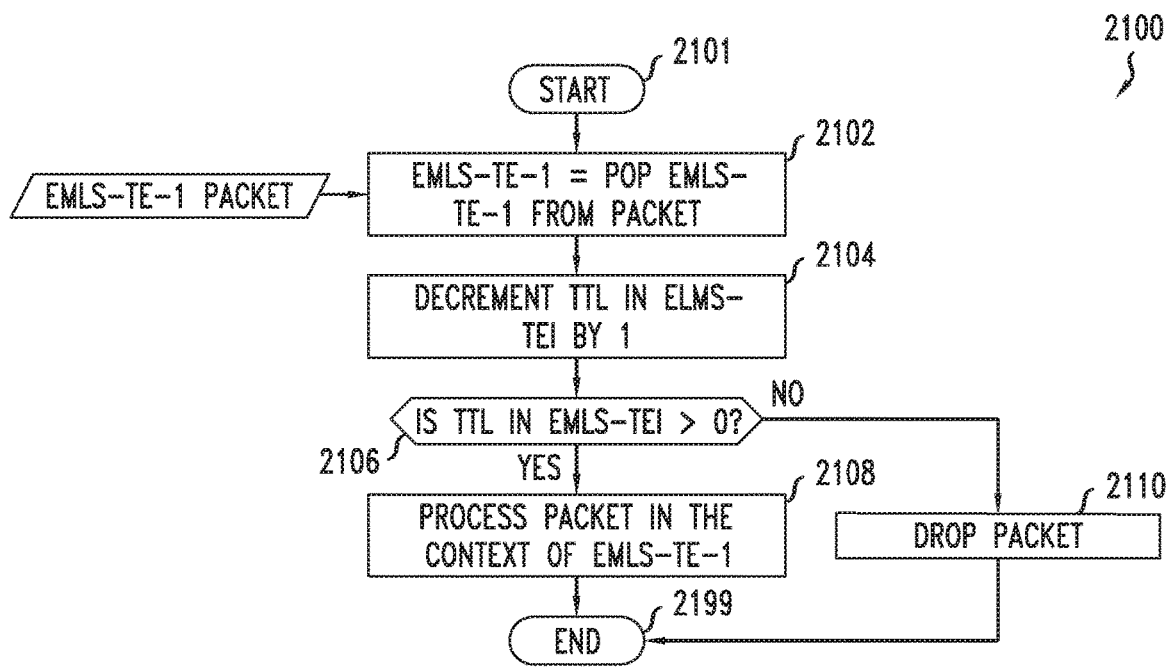
FIG. 21 depicts an example embodiment of a method for use by an egress, bud, or transit router to process a received EMLS-TE-1 packet.

FIG. 21 depicts an example embodiment of a method for use by an egress, bud, or transit router to process a received EMLS-TE-1 packet. It will be appreciated that, although primarily presented as being performed serially, at least a portion of the functions of method 2100 may be performed contemporaneously or in a different order than as presented with respect to FIG. 21. The method 2100 begins at block 2101. The input to method 2100 is an EMLS-TE-1 packet. Block 2102 pops the EMLS-TE-1 from the packet, and the method 2100 then proceeds to block 2104. Block 2104 decrements the TTL in EMLS-TEI (of EMLS-TE-1) by one, and the method 2100 then proceeds to block 2106. Block 2106 checks if the TTL in EMLS-TEI is greater than zero. If the TTL in EMLS-TEI is greater than zero, the method 2100 proceeds to block 2108; otherwise, the method 2100 proceeds to block 2110. Block 2108 processes the packet in the context of the EMLS-TE-1. In at least some example embodiments, block 2108 may implemented by the method in FIGS. 19A and 19B, which implements the common processing part for any router in the stateless MPLS TE multicast domain. After block 2108, method 2100 proceeds to block 2199, where the method 2100 ends. Block 2110 drops the packet, as TTL has become zero. After block 2110, the method 2100 proceeds to block 2199 where the method 2100 ends.

It will be appreciated that processing of an EMLS-TE-1 packet may be provided in various other ways.

It will be appreciated that a control plane for advertising global labels of the global label space may be provided in various ways.

In at least some example embodiments, if the network is configured with routing protocols (e.g., OSPF, OSPFv3, IS-IS and BGP-LS) for flooding label mappings, then the routing protocols may be adapted to support flooding of global label mappings. In at least some example embodiments, these methods may implement block 1204 in FIG. 12 and block 1304 in FIG. 13.

In at least some example embodiments, global label mappings may be advertised using one or more new protocols or global label mapping advertising techniques.

It will be appreciated that a control plane for advertising global labels of the global label space may be provided in various other ways.

It will be appreciated that implementation of the stateless MPLS Multicast TE architecture that uses EMLS-TE-1 may be provided in various other ways.

Figure 22:
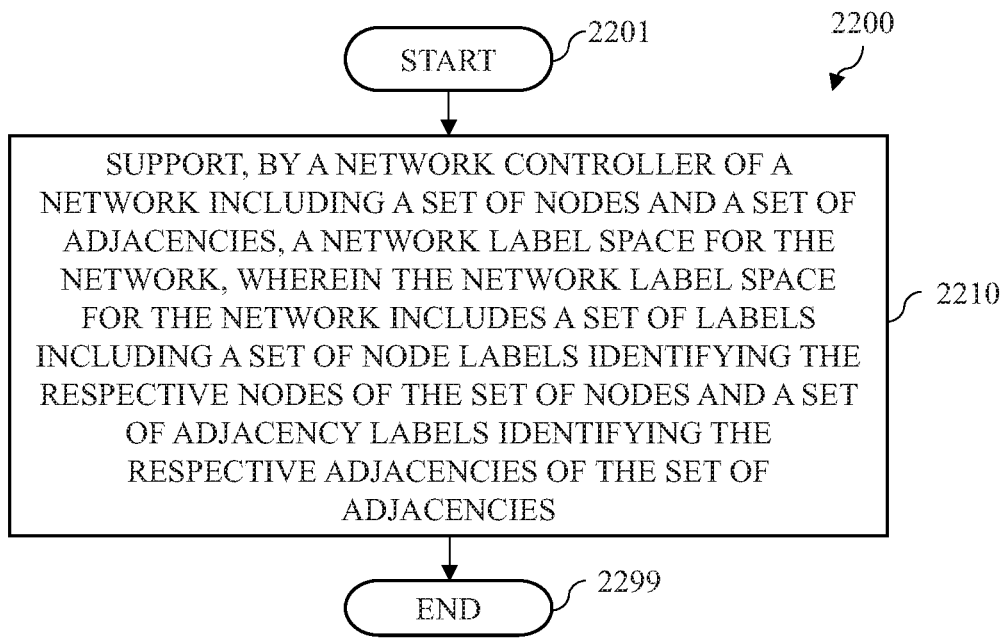
FIG. 22 depicts an example embodiment of a method for use by a network controller to support multicast communications within a network based on a global label space for the network.

FIG. 22 depicts an example embodiment of a method for use by a network controller to support multicast communications within a network based on a global label space for the network. It will be appreciated that, although primarily presented as being performed serially, at least a portion of the functions of method 2200 may be performed contemporaneously or in a different order than as presented with respect to FIG. 22. At block 2201, method 2200 begins. At block 2210, support, by a network controller of a network including a set of nodes and a set of adjacencies, a network label space for the network, wherein the network label space for the network includes a set of labels including a set of node labels identifying the respective nodes of the set of nodes and a set of adjacency labels identifying the respective adjacencies of the set of adjacencies. At block 2299, method 2200 ends. It will be appreciated that various packet communication support functions presented herein with respect to FIGS. 1-21 may be incorporated within the context of method 2200 of FIG. 22.

Figure 23:
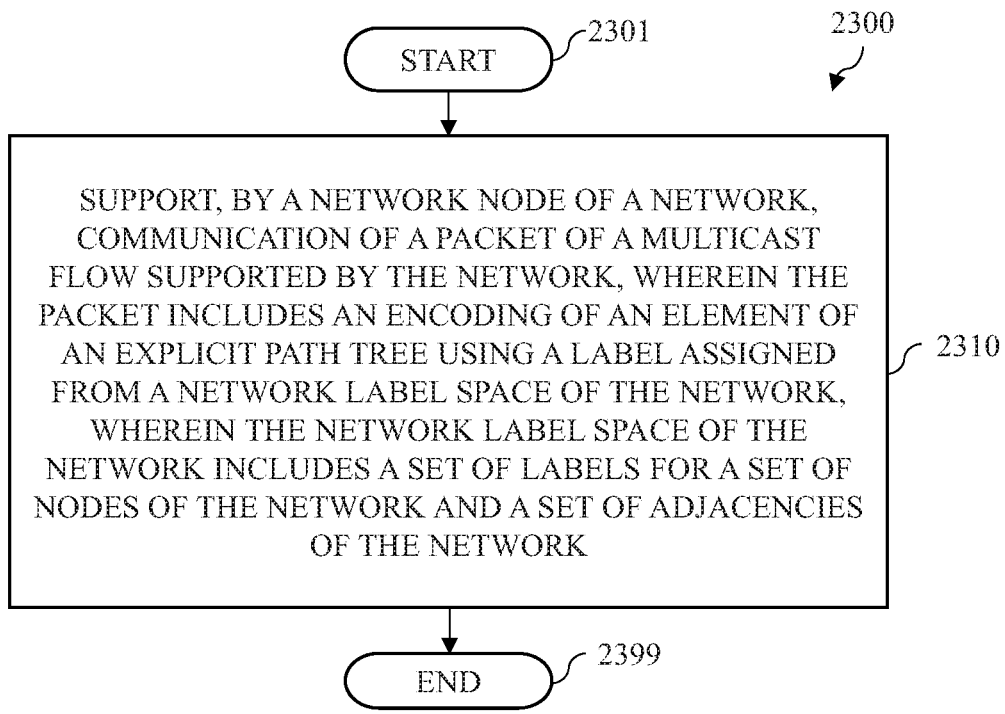
FIG. 23 depicts an example embodiment of a method for use by a network device to support multicast communications within a network based on a global label space for the network.

FIG. 23 depicts an example embodiment of a method for use by a network node to support multicast communications within a network based on a global label space for the network. It will be appreciated that, although primarily presented as being performed serially, at least a portion of the functions of method 2300 may be performed contemporaneously or in a different order than as presented with respect to FIG. 23. At block 2301, method 2300 begins. At block 2310, support, by a network node of a network, communication of a packet of a multicast flow supported by the network, wherein the packet includes an encoding of an element of an explicit path tree using a label assigned from a network label space of the network, wherein the network label space of the network includes a set of labels for a set of nodes of the network and a set of adjacencies of the network. At block 2399, method 2300 ends. It will be appreciated that various packet communication support functions presented herein with respect to FIGS. 1-21 may be incorporated within the context of method 2300 of FIG. 23.

Various example embodiments for supporting stateless multicast communications may provide various advantages or potential advantages. For example, various example embodiments for supporting stateless multicast communications may ensure that there is no overlapping of any node or adjacency labels across the stateless multicast domain such that, as each router along the explicit path tree scans the label stack, the router is able to uniquely identify the labels in the label stack that identify itself and/or its forward connected adjacencies. Various example embodiments for supporting stateless multicast communications may provide various other advantages or potential advantages.

Figure 24:
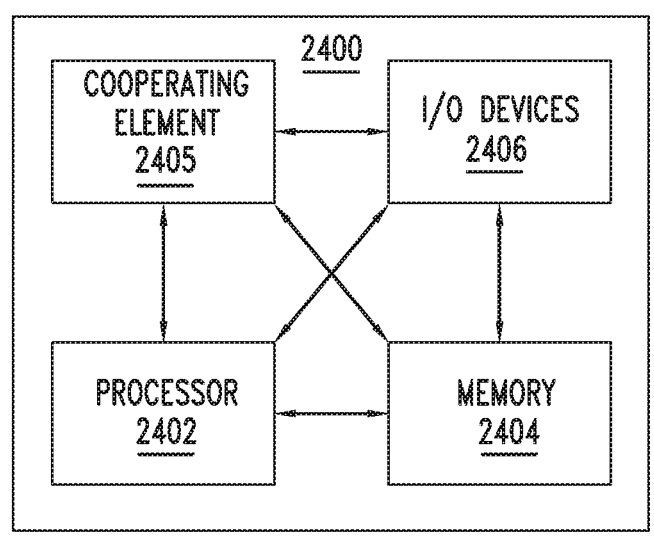
FIG. 24 depicts an example embodiment of a computer suitable for use in performing various functions presented herein.

FIG. 24 depicts an example embodiment of a computer suitable for use in performing various functions presented herein.

The computer 2400 includes a processor 2402 (e.g., a central processing unit (CPU), a processor, a processor having a set of processor cores, a processor core of a processor, or the like) and a memory 2404 (e.g., a random access memory, a read only memory, or the like). The processor 2402 and the memory 2404 may be communicatively connected. In at least some example embodiments, the computer 2400 may include at least one processor and at least one memory including computer program code, wherein the at least one memory and the computer program code are configured to, with the at least one processor, cause the computer to perform various functions presented herein.

The computer 2400 also may include a cooperating element 2405. The cooperating element 2405 may be a hardware device. The cooperating element 2405 may be a process that can be loaded into the memory 2404 and executed by the processor 2402 to implement various functions presented herein (in which case, for example, the cooperating element 2405 (including associated data structures) can be stored on a non-transitory computer-readable storage medium, such as a storage device or other suitable type of storage element (e.g., a magnetic drive, an optical drive, or the like)).

The computer 2400 also may include one or more input/output devices 2406. The input/output devices 2406 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 2400 may represent a general architecture and functionality suitable for implementing functional elements described herein, portions of functional elements described herein, or the like, as well as various combinations thereof. For example, computer 2400 may provide a general architecture and functionality that is suitable for implementing one or more elements presented herein, such as a network devices (e.g., routers or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory including a set of instructions;
wherein the set of instructions is configured to, when executed by the at least one processor, cause the apparatus to:
support, by a network node of a network, communication of a packet of a multicast flow supported by the network, wherein the packet includes an encoding of an element of an explicit path tree using a label assigned from a network label space of the network, wherein the network label space of the network includes a set of labels for a set of nodes of the network and a set of adjacencies of the network.

2. The apparatus of claim 1, wherein the set of labels for the set of nodes of the network and the set of adjacencies of the network includes a set of node labels for the set of nodes of the network and a set of adjacency labels for the set of adjacencies of the network.

3. The apparatus of claim 1, wherein the element is an adjacency of the explicit path tree, wherein, to support communication of the packet, the set of instructions is configured to, when executed by the at least one processor, cause the apparatus to:
determine, based on the label, whether the adjacency is a forward connected adjacency of the network node; and
forward, toward a next-hop node of the adjacency based on a determination that the adjacency is a forward connected adjacency of the network node, the packet.

4. The apparatus of claim 3, wherein, to forward the packet, the set of instructions is configured to, when executed by the at least one processor, cause the apparatus to:
remove, from the packet, the label to form a new packet;
create a copy of the new packet; and
forward the copy of the new packet toward the next-hop node of the adjacency.

5. The apparatus of claim 3, wherein the network node is an ingress node of the explicit path tree, a transit node of the explicit path tree, or a bud node of the explicit path tree.

6. The apparatus of claim 1, wherein the element is a node of the explicit path tree, wherein, to support communication of the packet, the set of instructions is configured to, when executed by the at least one processor, cause the apparatus to:
determine, based on the label, whether the label identifies the network node; and
handle the packet based on whether the label identifies the network node.

7. The apparatus of claim 6, wherein, to handle the packet based on a determination that the label does not identify the network node, the set of instructions is configured to, when executed by the at least one processor, cause the apparatus to ignore the label.

8. The apparatus of claim 6, wherein, to handle the packet based on a determination that the label does identify the network node, the set of instructions is configured to, when executed by the at least one processor, cause the apparatus to:
create a local copy of the packet;
remove, from the local copy of the packet, a header including the label to form a new packet; and
forward the new packet to a multicast flow overlay based on a native header of the new packet.

9. The apparatus of claim 6, wherein the network node is a transit node of the explicit path tree, a bud node of the explicit path tree, or a leaf node of the explicit path tree.

10. The apparatus of claim 1, wherein the network node is an ingress node of the explicit path tree, wherein the explicit path tree includes a set of egress nodes and a set of adjacencies, wherein the explicit path tree is encoded within the packet.

11. The apparatus of claim 10, wherein the explicit path tree is encoded within the packet based on a label stack including an encoding of the explicit path tree, a descriptor associated with the encoding of the explicit path tree, and a label stack identifier configured to indicate a presence of the label stack within the packet.

12. The apparatus of claim 11, wherein the encoding of the explicit path tree includes an encoding of a set of node labels identifying the respective egress nodes and a set of adjacency labels identifying the respective adjacencies.

13. The apparatus of claim 12, wherein the descriptor associated with the encoding of the explicit path tree includes a field indicative of a number of labels in the encoding of the explicit path tree.

14. The apparatus of claim 1, wherein the network node includes an ingress node of the explicit path tree, wherein the set of instructions is configured to, when executed by the at least one processor, cause the apparatus to:
send, from the network node toward a network controller, a request for the explicit path tree; and
receive, by the network node from the network controller, a response including a description of the explicit path tree.

15. The apparatus of claim 14, wherein the request for the explicit path tree includes a locally assigned identifier for the multicast flow, a set of egress nodes of the multicast flow, and an indication as to whether the network node is requesting that the network controller provide a set of labels of the explicit path tree.

16. The apparatus of claim 14, wherein the description of the explicit path tree includes the set of labels of the explicit path tree.

17. The apparatus of claim 14, wherein the description of the explicit path tree includes a set of node addresses for the respective nodes of the explicit path tree and a set of adjacency addresses for the respective adjacencies of the explicit path tree, wherein the set of instructions is configured to, when executed by the at least one processor, cause the apparatus to:
determine, by the network node based on local mapping information and the set of node addresses, a set of node labels for the respective egress nodes of the explicit path tree;
determine, by the network node based on the local mapping information and the set of adjacency addresses, a set of adjacency labels for the respective adjacencies of the explicit path tree; and
determine, by the network node based on the set of node labels for the respective egress nodes of the explicit path tree and the set of adjacency labels for the respective adjacencies of the explicit path tree, an encoding of the explicit path tree.

18. A method, comprising:
supporting, by a network node of a network, communication of a packet of a multicast flow supported by the network, wherein the packet includes an encoding of an element of an explicit path tree using a label assigned from a network label space of the network, wherein the network label space of the network includes a set of labels for a set of nodes of the network and a set of adjacencies of the network.

19. An apparatus, comprising:
at least one processor; and
at least one memory including a set of instructions;
wherein the set of instructions is configured to, when executed by the at least one processor, cause the apparatus to:
support, by a network controller of a network including a set of nodes and a set of adjacencies, a network label space for the network, wherein the network label space for the network includes a set of labels including a set of node labels identifying the respective nodes in the set of nodes and a set of adjacency labels identifying the respective adjacencies in the set of adjacencies.

\* \* \* \* \*